United States Patent [19]

Dammann et al.

[11] Patent Number: 4,788,083
[45] Date of Patent: Nov. 29, 1988

[54] TIN OR BISMUTH COMPLEX CATALYSTS AND TRIGGER CURE OF COATINGS THEREWITH

[75] Inventors: Laurence G. Dammann, Westerville; Gary M. Carlson, Columbus, both of Ohio

[73] Assignee: Ashland Oil, Inc., Ashland, Ky.

[21] Appl. No.: 931,610

[22] Filed: Nov. 17, 1986

Related U.S. Application Data

[63] Continuation-in-part of Ser. No. 844,810, Mar. 27, 1986, abandoned.

[51] Int. Cl.$^4$ .......................... B01J 31/00; B05D 3/04; C08G 18/22
[52] U.S. Cl. .................................. 427/340; 427/385.5; 427/426; 502/152; 502/155; 502/156; 502/168; 502/169; 502/170; 502/216; 502/242; 502/349; 502/353; 521/118; 521/121; 528/55; 528/58
[58] Field of Search .................. 427/340, 426, 385.5; 521/121, 118; 528/58, 55; 502/216, 170, 152, 155, 156, 168, 169, 242, 346, 353

[56] References Cited

U.S. PATENT DOCUMENTS

| | | | |
|---|---|---|---|
| 3,124,543 | 3/1964 | Fowk et al. | 260/2.5 |
| 3,219,589 | 1/1965 | Burke et al. | 502/156 |
| 3,392,128 | 7/1968 | Hostettier | 260/22 |
| 3,446,780 | 5/1969 | Bertozzi et al. | 528/55 |
| 3,635,906 | 1/1972 | Jayawant | 528/58 |
| 3,783,152 | 1/1974 | Larsen | 528/58 |
| 3,914,198 | 10/1975 | Olstowski | 528/58 |
| 3,972,829 | 8/1976 | Michalko | 502/168 |
| 4,022,721 | 5/1977 | Ashida | 528/55 |
| 4,038,114 | 7/1977 | Oberth | 502/168 |
| 4,081,429 | 3/1978 | Wyman | 528/58 |
| 4,237,235 | 12/1980 | Mazzucco | 528/55 |
| 4,517,222 | 5/1985 | Blegen | 427/30 |

FOREIGN PATENT DOCUMENTS

| | | |
|---|---|---|
| 2724 | 7/1979 | European Pat. Off. |
| 1006840 | 6/1962 | United Kingdom |
| 1184197 | 3/1970 | United Kingdom |
| 1332700 | 10/1973 | United Kingdom |
| 1513767 | 6/1978 | United Kingdom |
| 2015011 | 9/1979 | United Kingdom |
| 2046756 | 11/1980 | United Kingdom |
| 2088886 | 10/1981 | United Kingdom |
| 2073220 | 10/1981 | United Kingdom |
| 2087908 | 6/1982 | United Kingdom |
| 2139625 | 11/1984 | United Kingdom |

Primary Examiner—Janyce Bell
Attorney, Agent, or Firm—Mueller and Smith

[57] ABSTRACT

Disclosed is an activatable catalyst which is effective for the reaction of a hydroxyl compound and an isocyanate. Preferably, the catalyst is utilized in the cure of a coating composition of a polyol and a polyisocyanate. The activatable catalyst is activated in the presence of an amine activator or heat and comprises the reaction product of a metal catalyst selected from a tin catalyst, a bismuth catalyst, and mixtures thereof; and a molar excess of a complexing agent. The complexing agent is selected from a mercapto compound, a polyphenol characterized by being reactable with an isocyanate group in the presence of a tertiary amine activator, and mixtures thereof. A single polyol resin may bear both the complexing functionality and the activatable catalyst. Advantageously, the polyol and polyisocyanate both are aliphatic.

68 Claims, 4 Drawing Sheets

TIN OR BISMUTH COMPLEX CATALYSTS AND TRIGGER CURE OF COATINGS THEREWITH

CROSS-REFERENCE TO RELATED APPLICATION

This application is a continuation-in-part of application U.S. Ser. No. 06/844,810, filed Mar. 27, 1986, now abandoned.

BACKGROUND OF THE INVENTION

The present invention relates to polyol/polyisocyanate coating compositions and more particularly to a unique catalyst system effective therefor.

Vapor permeation curable coatings traditionally are a class of coatings formulated from aromatic hydroxyl-functional polymers and multiisocyanate cross-linking agents wherein an applied film thereof is cured by exposure to a vaporous tertiary amine catalyst. In order to contain and handle the vaporous tertiary amine catalyst economically and safely, curing chambers were developed. Curing chambers typically are substantially empty boxes through which a conveyor bearing the coated substrate passes and in which the vaporous tertiary amine, normally borne by an inert gas carrier, contacts such coated substrate. The use of aromatic hydroxy-functional polymers is recommended if an extended pot life system is required. If two-pack formulations are acceptable, then use of aliphatic hydroxyl-functional resins can be made. Multi-isocyanate cross-linking agents in traditional vapor permeation curable coatings contain at least some aromatic isocyanate groups in order for practical cure rates to be achieved.

Such traditional vapor permeation curable coatings requirements have been altered to a degree by the vaporous amine catalyst spray method disclosed by Blegen in U.S. Pat. No. 4,517,222. Such vaporous catalyst spray method relies on the concurrent generation of an atomizate of a coating composition and a carrier gas bearing a catalytic amount of a vaporous tertiary amine catalyst. Such generated atomizate and vaporous catalytic amine-bearing carrier gas flow are admixed and directed onto a substrate to form a film thereover. Curing is rapid and use of a curing chamber is not required. Moreover, all aliphatic isocyanate curing agents can be utilized in such spray process. Aromatic hydroxyl groups on the resin, however, still are required.

One drawback to the requirement of aromatic hydroxyl groups on the resin is the inherent limitation which such aromaticity provides in formulating high solids coatings. The same is true of the requirement of aromaticity in the multi-isocyanate cross-linking agent. Such non-volatile solids content restriction even applies to the vaporous amine catalyst spray method described above.

Despite the improvements in the vapor permeation curable coatings field, all-aliphatic, high-performance urethane top coats still have yet to be developed. Instead, such urethane top coats traditionally are heat-cured in the presence of a tin or like metal catalyst. There is a need in the art for adapting vapor permeation curable coatings technology to such urethane top coats desirably utilizing conventional tin catalyst systems. Such need in the art is addressed by the present invention.

BROAD STATEMENT OF THE INVENTION

The present invention solves many of the limitations which have been placed on chamber-cured vapor permeation curable coatings and on spray cured vapor permeation curable coatings by adapting conventional urethane top coat formulations to be applied and cured by traditional vapor permeation curable coatings technology. More generally, however, the novel catalysts of the present invention respond in traditional heat-cured urethane systems also.

One aspect of the present invention comprises an activatable catalyst effective for the reaction of a hydroxyl group and an isocyanate group and being activated in the presence of an amine catalyst or heat. Such activatable catalyst comprises the reaction product of a metal catalyst selected from a tin catalyst, a bismuth catalyst, and mixtures thereof and a molar excess of a complexing agent. The complexing agent is selected from the group of a mercapto compound, a polyphenol characterized by being reactable with an isocyanate group in the presence of a tertiary amine catalyst, and mixtures thereof.

A further aspect of the present invention is a catalyzed reaction mixture which comprises a polyol, a polyisocyanate, optionally solvent, and the activatable catalyst set forth above. Another aspect of the present invention is a catalyzed reaction mixture wherein the polyol resin bears the complexing agent functionality which then is complexed with the tin catalyst or bismuth catalyst. The catalyzed reaction mixture further comprises the polyisocyanate and optionally solvent.

Yet another aspect of the present invention is a method for curing the catalyzed reaction mixture which comprises applying a film of the catalyzed reaction mixture to a substrate wherein the catalyzed reaction mixture is set forth above. The applied film then is exposed to an amine activator or heat for effecting cure. Utilizing the amine activator, cure proceeds at room temperature.

Yet a further aspect of the present invention involves the application of the catalyzed reaction mixture as an atomizate, which atomizate is mixed with an amine activator and the mixture applied to a substrate as a film. The amine activator can be present in the catalyzed reaction mixture as a vapor or as a liquid.

Still another aspect of the present invention is directed to a method for improving the pot life of a catalyzed reaction mixture of a polyol and a polyisocyanate wherein the catalyst is selected from a tin catalyst, a bismuth catalyst, or mixtures thereof. This method comprises reacting the catalyst with a molar excess of a complexing agent selected from a mercapto group, a polyphenol characterized by being reactable with an isocyanate group in the presence of a teriary amine activator, and mixtures thereof. Additional stability can be gained by further blending a chelating agent therewith.

Advantages of the present invention include the ability to formulate a catalyzed reaction mixture which has a very long and useful pot life. Another advantage is that such reaction mixture can be rapidly cured merely in the presence of an amine activator. A further advantage is that the catalyzed reaction mixture need not be heated for achieving cure, but can be heat cured if desired. Yet another advantage is the ability to utilize the inventive catalyst system in conventional urethane coating compositions, especially high-performance urethane top coats. These and other advantages will be readily apparent to those skilled in the art based upon the disclosure contained herein.

Figure 1:
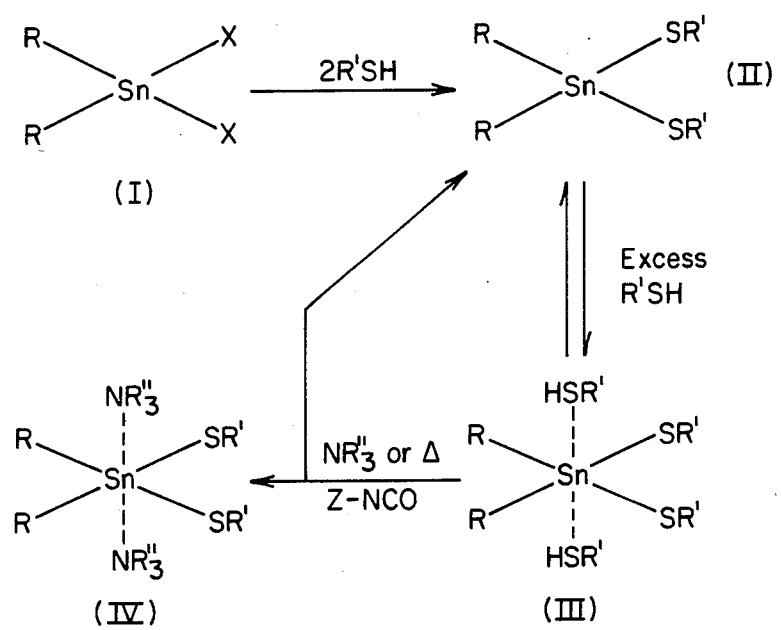
FIG. 1 is a diagrammatic representation of the catalyst complex formation and subsequent actuation as illustrated by a tin catalyst and a mercapto complexing agent.

The drawings will be described in detail below.

DETAILED DESCRIPTION OF THE INVENTION

Conventional urethane coatings, especially top coats, are provided as two separate packages (a two-pack system). One pack, typically Part A, is the polyol while the second pack, Part B, is the polyisocyanate. Solvents and other conventional paint additives are added to each pack in accordance with conventional teachings. The catalyst, typically a tin or other metal catalyst, often is included in the polyol pack in order to ensure against premature gelation of the polyisocyanate. Occasionally, the catalyst package is not added to either Part A or Part B until just prior to application of the coating composition.

Application of such conventional two-pack coating compositions typically comprehend the admixture of the two packs just before application which may be by conventional roll coat, reverse roll coat, or other conventional tactile means; or can be by spray techniques utilizing a conventional two-head spray gun. Regardless of the application technique, the two packs are kept separate in order to prevent premature reaction with attendant viscosity increase which prevents effective application. The applied coatings often are baked in order to speed the cure and ensure expulsion of solvent from the applied film.

One of the unique features of the inventive catalyst system involves the extended pot lives which result by virtue of its use. Such extended pot lives are realized without the need for formulating specially designed resins, curing agents, or the like. Yet, the catalyzed reaction mixture can be cured "on demand" or "triggered" merely by presenting an amine activator to, or by heating of, the catalyzed reaction mixture. Such a combination of characteristics does not result even from the use of conventional tin mercaptide catalysts alone and this point is important. The catalyst system of the present invention is not a tin mercaptide, but is the reaction product of a tin catalyst and a molar excess of a complexing agent such as a mercapto compound which reaction product is formed at room temperature merely upon mixing, referred to herein as a tin/mercaptan complex catalyst. In fact, even a tin mercaptide catalyzed coating composition can have its pot life extended by the addition of a mercapto compound. Whether a tin mercaptide/mercapto complex is formed is not known precisely, though the combination of extended pot life and rapid cure in the presence of an amine activator has been confirmed experimentally. Much of the description herein refers to a tin catalyst and a mercapto complexing agent by way of illustration and not by way of limitation.

In this regard, it should be understood that a molar excess of mercapto compound to tin catalyst is used to form the novel tin catalyst/mercaptan complexes. By molar excess of mercapto compound is meant that sufficient mercapto compound is added t the tin catalyst so that the pot life of a polyol/polyisocyanate mixture has a pot life at least twice as long as the same mixture containing only the tin catalyst (i.e. sans mercapto compound). Generally, this translates into a molar ratio of mercapto compound to tin catalyst of between about 2:1 and 500:1, depending upon the particular choice of tin catalyst, mercapto compound, other formulation ingredients, etc. For present purposes, the pot life of a coating composition is the time required for the viscosity of the coating in an open pot to double from its initial viscosity.

Without being bound by theory, it appears that the tin catalyst and the mercapto compound form a complex which blocks or otherwise renders unreactive the tin catalyst. The structure of the complex and reaction for its formation are illustrated at FIG. 1. Referring to FIG. 1, catalyst structure I is a conventional tin catalyst such as dibutyltin dilaurate, for example, where ligands X would be laurate groups. It is believed that the initial reaction occurring upon the addition of a mercapto compound, e.g. R'SH, involves the displacement of two of the ligands, e.g. the laurate groups, with their replacement by the mercapto groups to yield catalyst species II. Both catalyst species I and II are active catalyst species in that they promote the hydroxyl/isocyanate reaction.

Next, upon the addition of excess mercapto compound, an equilibrium reaction is established between catalyst species II and III. It will be appreciated that this reaction involves the tin metal being converted from a tetracoordinate species to a hexacoordinate species upon the coordination of additional mercapto groups therewith. Catalyst species III is inactive and is the novel catalyst species of the present invention. It is catalyst species III which permits a catalyzed system to be formulated which retains excellent pot life. It also is catalyst species III which is able to be activated or triggered on demand.

The trigger which converts catalyst species III to an active form comprises either an amine or heat. It is possible that the trigger results in the release of catalyst species II, IV, or a combination. Regardless of which active species is released, the presence of the trigger, e.g. amine or heat, and isocyanate functionality is required. The isocyanate functionality is reactive with the complexing agent (e.g. mercapto group) which enhances the conversion of inactive catalyst species III to active catalyst species II or IV. The released or displaced mercapto groups react with the free isocyanate groups in the coating, forming thiocarbamate linkages. Thiocarbamate linkages have been shown to be catalytic in the hydroxyl/isocyanate reaction in copending application Ser. No. 06/905,700, filed Sept. 9, 1986, now U.S. Pat. No. 4,753,825. Such thiocarbamate linkages only serve to further promote the hydroxyl/isocyanate reaction and cure of the coating.

It will be appreciated that FIG. 1 and the foregoing description are illustrative of the present invention in that the active metal catalyst can be bismuth also. For that matter, the complexing agent also may be a polyphenol as described in further detail below.

Referring now to the tin catalyst, a variety of conventional tin catalysts can be used advantageously in the inventive catalyst system and catalyzed reaction mixture of the present invention. Conventional tin catalysts include, for example stannous octoate, di-alkyl tin dicarboxylates such as dibutyltin dicarboxylates (e.g. dibutyltin dioctoate), tin mercaptides (e.g. dibutyltin dilaurylmercaptide), stannous acetate, stannic oxide, stannous citrate, stannous oxylate, stannous chloride, stannic chloride, tetra-phenyl tin, tetra-butyl tin, tri-n-butyl tin acetate, di-n-butyl tin dilaurate, dimethyl tin dichloride, and the like and even mixtures thereof. It is conceivable that certain tin catalysts and certain mercaptans (or polyphenols) may not form as effective complexes as is desirable due to steric hindrance. Still, it is believed that a usable complex can be formed from most tin catalysts and most mercaptans (and polyphenols).

A variety of conventional bismuth catalysts also can be used to advantage in the present invention. Conventional bismuth catalysts include, for example, bismuth tricarboxylates (e.g. acetates, oleates, etc.), bismuth nitrate, bismuth halides (e.g. bromide, chloride, iodide, etc.), bismuth sulfide, basic bismuth dicarboxylates (e.g. bismuthyl bis-neodecanoate, bismuth subsalicylate, bismuth subgallate, etc), and the like and mixtures thereof.

Referring now to the mercaptans, a variety of monofunctional and poly-functional mercaptans can be used to advantage in accordance with the precepts of the present invention. Representative mercaptans include, for example, trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha,alpha'-dimercapto-paraxylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,5,6-tetrafluorothiophenol, cyclohexyl mercaptan, methylthioglycolate, various mercapto pyridines, dithioerythritrol, 6-ethoxy-2-mercaptobenzothiazole, d-limonene dimercaptan, and the ike and mixtures thereof. Further useful mecaptans can be found in various catalogs of commercially-available mercaptans.

In addition to supplying a monofunctional or polyfunctional mercaptan monomer or oligomer, a variety of resinous compounds can be synthesized or modified to contain pendant mercaptan or thiol groups. Various mercaptans suitable for synthesizing the mercapto-functional resinous materials for use in forming the coating compositions of the present invention include, for example, 1,4-butane dithiol, 2,3-dimercapto propanol, toluene-3,4-dithiol, and alpha,alpha'-dimercapto-p-xylene. Other suitable active mercaptan compounds include thiosalicylic acid, mercapto acetic acid, 2-mercapto ethanol, dodecane dithiol, didodecane dithiol, dithiol phenol, di-parachlorothiophenol, dimercapto benzothiazole, 3,4-dimercapto toluene, allyl mercaptan 1,6 hexane dithiol, mercapto propionic acid, p-thiocresol, d-limonene dimercaptan, cyclohexyl mercaptan, methylthioglycolate, mercapto pyridines, dithioerythritrol, 6-ethoxy-2-mercaptobenzothiazole, and the like. Further useful mercaptans can be found in various catalogs of commercially-available mercaptans.

Virtually any oligomer, polymer, or resinous compound can be modified to contain pendant mercaptan or thiol groups. Representative resinous materials containing mercaptan groups can be derived from, for example, epoxy and epoxy-modified diglycidyl ethers of bisphenol A structures, mercaptan-functional urethane resins, various aliphatic polyethylene or polypropylene glycol (diglycidyl ether) adducts, and glycidyl ethers of phenolic resins. Other useful polymers containing pendant mercaptan groups include polyamide resins, for example, condensation products of dimerized fatty acids coreacted with difunctional amine, such as ethylene diamine, followed by reaction with 3-mercapto propionic acid or the like. A variety of acrylic resins and vinyl resins can be readily envisioned for modification in accordance with the precepts of the present invention additionally.

In this regard, it should be understood that virtually any conventional hydroxyl-containing monomer, oligomer, or polymer previously proposed for use in vapor permeation curable coatings can be suitably modified to contain pendant mercaptan groups for use in formulating coating compositions in accordance with the present invention. For example, esterification (or transesterification) of such polyols with a mercaptan-terminated acid is but one technique which can be readily envisioned for use in modifying such prior vapor permeation curable materials for use in formulating the coating compositions of the present invention. While not exhaustive, the following discussion discloses prior vapor permeation curable coating compositions which can be suitably modified. U.S. Pat. No. 3,409,579 discloses a binder composition of a phenol-aldehyde resin (including resole, novolac, and resitole), which preferably is a benzylic ether or a polyether phenol resin. U.S. Pat. No. 3,676,392 discloses a resin composition in an organic solvent composed of a polyether phenol or a methylol-terminated phenolic (resole) resin. U.S. Pat. No. 3,429,848 discloses a composition like that in U.S. Pat. No. 3,409,579 with the addition of a silane thereto.

U.S. Pat. No. 3,789,044 discloses a polyepoxide resin capped with hydroxybenzoic acid. U.S. Pat. No. 3,822,226 discloses a curable composition of a phenol reacted with an unsaturated material selected from unsaturated fatty acid, oils, fatty acid esters, butadiene homopolymers, butadiene copolymers, alcohols and acids. U.S. Pat. No. 3,836,491 discloses a similar hydroxy-functional polymer (e.g. polyester, acrylic, polyether, etc.) capped with hydroxybenzoic acid. British Pat. No. 1,369,351 discloses a hydroxy or epoxy compound which has been capped with diphenolic acid. British Pat. No. 1,351,881 modifies a polyhydroxy, polyepoxy, or polycarboxyl resin with the reaction product of a phenol and an aldehyde.

U.S. Pat. No. 2,967,117 discloses a polyhydroxy polyester while U.S. Pat. No. 4,267,239 reacts an alkyd resin with para-hydroxybenzoic acid. U.S. Pat. No. 4,298,658 proposes an alkyd resin modified with 2,6-dimethylol-p-cresol.

U.S. Pat. Nos. 4,343,839, 4,365,039, and 4,374,167 disclose polyester resin coatings especially adapted for flexible substrates. U.S. Pat. No. 4,374,181 discloses resins especially adapted for application to reaction injection molded (RIM) urethane parts. U.S. Pat. No. 4,331,782 discloses a hydroxybenzoic acid-epoxy adduct. U.S. Pat. No. 4,343,924 proposes a stabilized phenol-functional condensation product of a phenol-aldehyde reaction product. U.S. Pat. No. 4,366,193 proposes the use of 1,2-dihydroxybenzene or derivatives thereof in vapor permeation curable coatings. U.S. Pat. No. 4,368,222 discloses the uniqueness of utilizing vapor permeation curable coatings on surface-porous substrates of fibrous-reinforced molding compounds (e.g. SMC). Finally, U.S. Pat. No. 4,396,647 discloses the use of 2,3',4-trihydroxy diphenyl.

It will be appreciated that the foregoing aromatic-hydroxyl polymers or resin as well as many other resins suitably can be modified to contain mercaptan groups for use in formulating coating compositions in accordance with the precepts of the present invention.

The hydroxy compound also may be a hydroxy urethane prepolymer which can be a polyol or monomeric alcohol provided from a polyester, polyether, polyurethane, polysulfide, or the like. Ethylenic unsaturation even can be provided by the monomeric alcohol or polyol itself or can be reacted onto a polyol or monomeric alcohol subsequently by conventional reaction schemes, if such unsaturation is desirable. Conventional reaction schemes call for the reaction of a monomeric alcohol or polyol with, for example, acrylic acids, acrylyl halides, acrylic-terminated ethers, acrylic or methacrylic anhydrides, isocyanate-terminated acrylates, epoxy acrylates, and the like. Further reaction schemes for formulating hydroxy urethane prepolymers include reaction of a hydroxy-acrylate monomer, hydroxy methacrylate monomer, or an allyl ether alcohol with a cyclic anhydride such as, for example, the anhydrides: maleic, phthalic, succinic, norborene, glutaric, and the like. Unsaturated polyol-polyesters optionally then can be reacted with a suitable oxirane, such as, for example, ethylene oxide, propylene oxide, glycidyl acrylate, allyl glycidyl ether, alpha-olefin epoxides, butyl glycidyl ether, and the like. Suitable allyl alcohols include, for example, trimethylolpropane monoallyl ether, trimethylol propane diallyl ether, allyl hydroxylpropylether, and the like.

Additional conventional reaction schemes for producing a hydroxy urethane prepolymer include reacting alpha-aliphatic or aromatic substituted acrylic acids with an oxirane compound, and reacting a hydroxy acrylate or hydroxy methacrylate with dimercaptan compound. Any of the foregoing compounds also can be reacted further with a diisocyanate to produce a hydroxy urethane prepolymer having urethane linkages. Thus, it will be observed that there is almost no limit to the types of polyols and their synthesis for use in accordance with the precepts of the present invention.

An additional unique embodiment of the present invention involves the modification of a polyol resin to contain but a few pendant mercaptan or thiol groups which mercaptan or thiol groups can be complexed with the tin catalyst. While synthesis of such modified resins would appear to be routine, it has been discovered to be quite difficult to control the reaction so that the resulting resinous products predominate in hydroxyl groups. Thus, a reaction scheme based on the Dammann process as disclosed in commonly-assigned U.S. Pat. No. 4,732,945 is used. The Dammann process relates t the synthesis of aliphatic polyol resins which contain a minor proportion of aromatic hydroxyl or mercapto groups. The basic reaction scheme developed in accordance with the Dammann process involves the formation of a glycidyl-functional polyol (e.g. acrylic polyol) in a first stage followed by the addition of a mercapto-compound containing carboxyl or other functionality reactive with the glycidyl groups in a second stage reaction. Thus, a variety of polyol resins, such as those described above, can be suitably modified in accordance with the Dammann process to contain a minor proportion of mercaptan groups, rather than a major proportion of mercaptan groups as such synthesis techniques were described above. The examples will demonstrate such a unique resin which provides aliphatic (or aromatic) hydroxyl functionality, mercaptan groups, and the tin catalyst in a single molecule. Such embodiment contributes to the ability to formulate coatings compositions at much higher solids than was heretofore possible.

An additional class of compounds which have been demonstrated to be effective in forming an inactive tin or bismuth catalyst complex comprises a particular class of polyphenols which are characterized by being reactable with an isocyanate group in the presence of a tertiary amine activator. Absent the tertiary amine catalyst, the polyphenols will tend to be quite unreactive with isocyanate groups for extended periods of time. It is believed that the polyphenols can form a hexacoordinate complex with tin, such as catalyst species III of FIG. 1. The polyphenols, being reactable with isocyanate functionality in the presence of tertiary amine activator, behave as do mercapto groups in the presence of tertiary amine activators. Heat, too, will promote the release of an active tin catalyst species. Representative polyphenols which function for forming the novel inactive tin or bismuth catalyst complex of the present invention include a catechol, pyrogallol, 3-methoxy catechol, and the like. These polyphenols are more fully disclosed in U.S. Pat. No. 4,366,193.

With respect to the proportions of catalyst system, the proportion of tin or bismuth catalyst should be adjusted to be in an effective catalytic amount for the polyol/polyisocyanate reaction. Typically, this translates into active tin/bismuth catalyst concentration levels ranging from about 0.0001 to about 1.0 weight percent. The proportion of mercaptan or polyphenol generally is adjusted to be substantially in excess of the proportion of tin/bismuth catalyst. At higher complexing agent/metal catalyst ratios, better stability (pot life) is observed while cure of the coating composition is not as fast. At a given ratio, higher metal catalyst levels provide faster cure, but shorter pot life. Catalyst/complexing agent ratios will vary depending upon the particular tin or bismuth catalyst, the particular mercaptan or polyphenol, the polyol and polyisocyanate of choice, and the performance requirements desired. Generally, however, complexing agent metal content of the catalyst mole ratios ranging fom about 2:1 to about 500:1 have been found to be useful in the catalyzed reaction mixture of the present invention, as discussed above.

Polyisocyanate cross-linking agents cross link with the hydroxyl groups of the resin or polymer under the influence of the tin catalyst to cure the coating. Aromatic, aliphatic, or mixed aromatic/aliphatic isocyanates may be used. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDI), bis-(isocyanatomethyl)cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (includin biuret and isocyanurate derivatives), and isocyanate functional prepolymers often are available as preformed packages and such packages are suitable for use in the present invention also.

The ratio of isocyanate equivalents of the polyisocyanate cross-linking agents to the hydrxyl groups from the hydroxy resinous materials preferably should be greater than about 1:1 and can range from about 1:2 on up to about 2:1. The precise intended application of the coating composition often will dictate this ratio or isocyanate index.

As noted above, a solvent or vehicle may be included as part of the coating composition. Volatile organic solvents may include ketones and esters for minimizing viscosity, though some aromatic solvent may be necessary and typically is part of the volatiles contained in commercial isocyanate polymers. Representative volatile organic solvents include, for example, methyl ethyl ketone, acetone, butyl acetate, methyl amyl ketone, methyl isobutyl ketone, ethylene glycol monoethyl ether acetate (sold under the trademark Cellosolve acetate), and the like. Organic solvents commercially utilized in polyisocyanate polymers include, for example, toluene, xylene, and the like. It should be noted that the effective non-volatile solids content of the coating composition can be increased by incorporation of a relatively low or non-volatile (high boiling) ester plasticizer which is retained for the most part in the cured film. Such suitable ester plasticizers include, for example, dibutyl phthalate, di(2-ethylhexyl)phthalate (DOP), and the like. The proportion of ester plasticizer should not exceed about 5-10% by weight, otherwise loss of mar resistance can occur.

The coating composition additionally can contain opacifying pigments and inert extenders such as, for example, titanium dioxide, zinc oxide, clays such as kaolinite clays, silica, talc, carbon or graphite (e.g. for conductive coatings), and the like. Additionally, the coating compositions can contain tinctorial pigments, corrosion-inhibiting pigments, and a variety of agents typically found in coating compositions. Such additional additives include, for example, surfactants, flow or leveling agents, pigment dispersants, and the like. The ingredients utilized in making the coating compositions are such that lower acid value systems result. Higher acid values tend to shorten pot life and retard cure of the coating compositions, as well as may require additional amine to be used for achieving cure. Thus, the preference for lower acid value systems.

An additional class of additives which optionally may find utility in the inventive coating compositions of the present invention comprise ketone-based chelating agents. For example, U.S. Pat. No. 3,314,834 shows that diketo chelating agents are useful for extending the pot lives of urethane propellants. U.S. Pat. No. 3,635,906 shows that urethane coating compositions can have improved pot lives if the catalysts are complexed with beta-dicarbonyls, alpha-hydroxy ketones, or fused aromatic beta-hydroxy ketones. Additional ketone-based chelating agents which may find utility in the inventive reaction mixtures include, for example, dialkyl malonates, aceto acetic esters, alkyl lactates, and alkyl pyruvates. While such chelating agents do not provide the degree of pot life which is achieved by use of the mercapto compounds or polyphenols of the present invention, their presence can aid in extending the pot life of the system as the examples will demonstrate. Further, it should be understood that such ketone chelating agents do not provide inactive catalyst species which can be triggered by amine or low temperature heating since the ketone-based chelating agents are not reactive with isocyanate functionality under normal conditions. In addition, such ketone chelating agents are less effective than mercaptans or phenols at complexing with tin or bismuth, as the examples will demonstrate.

As to the performance requirements which are met by the coating composition, it should be noted that the coating composition can be formulated to have a minimum pot life of at least 4 hours in an open pot and generally the coating can be formulated to have a pot life which exceeds 8 hours and can range up to 18 hours or more. Such extended pot life means that refilling the pot at the plant during shifts generally is not required. Moreover, the pot life of the coating composition in a closed container can exceed one day depending upon formulation of the coating composition. After storage of the coating composition, the stored composition can be cut to application viscosity with suitable solvent (if required) and such composition retains all of the excellent performance characteristics which it initially possessed.

The amine activator can be supplied in the liquid phae or the vapor phase and preferably will be a tertiary amine including, for example, tertiary amines containing substituents such as alkyl, alkanol, aryl, cycloaliphatic, and mixtures thereof. Additionally, heterocyclic tertiary amines may be suitable for use in the invention also. Representative tertiary amines include, for example, triethylamine, dimethylethylamine, tetramethylenediamine, trimethylamine, tributylamine, dimethylbenzylamine, dimethylcyclohexylamine, dimethylethanolamine, diethylethanolamine, triethanolamine, pyridine, 4-phenylpropylpyridine, 2,4,6-collidine, quinoline, tripropylamine, isoquinoline, N-ethylmorpholine, triethylenediamine, and the like and mixtures thereof. Additionally, it is conceivable to use amine oxides and quaternary ammonium amines. A myriad of proprietary tertiary amine activators currently are available and should function in the process additionally. While the amine activator preferably will be a tertiary amine and preferably presented as a vaporous tertiary amine, it will be appreciated that the tertiary amine may be presented as a liquid and the present invention function effectively and efficiently. Further, primary and secondary amines also activate the tin/mercaptan catalyst complex, though they are not preferred since longer cure times are experienced therewith. Still, highly-hindered secondary amines may find utility, and may even be preferred, on occasion. Such non-tertiary amines which may be used include, for example, diisopropyl amine, di-t-butyl amine, dibutyl amine, t-butyl amine, diisopropyl amine, 1,1-dimethyl propyl amine, monoethanol amine, diethanol amine, and the like and mixtures thereof.

While the proportion of amine activator may range on up to 6 percent or more, percentages of less than 1 volume percent typically will suffice, e.g. between about 0.25 and 1 percent by volume. It will be appreciated that the proportion of amine activator will vary depending upon whether the amine activator is presented in its liquid state or in its vaporous state, and whether the amine activator is tertiary, primary, or secondary. Generally speaking, the proportion of liquid amine activator generally will be greater in concentration than with the amine activator supplied as a vapor, though this can vary. The same is true for the primary and secondary amines which require a greater level, apparently due to their reactivity in the system.

Heat activation of the catalyst complex comprehends baking of the applied coating composition at temperatures ranging from about 50° to 150° C. or higher for the time periods ranging from about 1 to 30 minutes. Such heating schedule for activation of the catalyst complex typically is less severe than is required for cure of the polyol/polyisocyanate coating composition without the presence of any catalyst. Of course, heating of the coated substrate even when an amine activator is used can be beneficial for solvent expulsion from the film as well as insuring that the film is non-blocking for rapid handling of the coated substrate. Again, such heating schedule tends to be rather mild in terms of temperature and time compared to conventional heat-cured urethane systems.

A variety of substrates can be coated with the coating compositions of the present invention. Substrates include metal, such as, for example, iron, steel, aluminum, copper, galvanized steel, zinc, and the like. Additionally, the coating composition can be applied to wood, fiberboard, RIM (reaction injection molding urethanes), SMC (sheet molding compound), vinyl, acrylic, or other polymeric or plastic material, paper, and the like. Since the coating compositions can be cured at room temperature, thermal damage to thermally-sensitive substrates is not a limitation on use of the coating compositions of the present invention. Further, with the ability to use the vaporous amine catalyst spray method, the flexibility in use of the coating compositions of the present invention is enhanced even further. It should be understood, however, that heating of the coating composition following application (e.g. between about 50° and 150° C.) often is recommended for enhancing solvent expulsion. In fact, heating at conventional curing temperatures even may be practiced on occasion.

Finally, it should be understood the present invention can be applied to primers, intermediate coats, and top coats, substantially independent of film thickness. In fact, the present invention may provide the ability to formulate a single coating which can function both as a primer and as a top coat (unicoat system).

The following examples show how the present invention can be practiced but should not be construed as limiting. In this application, all percentages and proportions are by weight, unless otherwise expressly indicated. Also, all units are in the metric system and all citations referred to herein are expressly incorporated by reference.

Examples

EXAMPLE I

Studies were undertaken to determine the effect of mercaptan structure on the stability of the tin/mercaptan complex as measured by viscosity (pot life) of a polyol/polyisocyanate coating composition. A master batch of coating composition was formulated from TONE 0305 polyol (polycapralactone triol, 100% nonvolatile solids, OH number 310, Union Carbide Corporation, 364 g)., DESMODUR N3390 polyisocyanate (hexamethylene diisocyanate trimer in ethyl acetate solvent at 90% solids, Mobay Chemical Company, 481 g.), and methyl amyl ketone (MAK) solvent (300 g.). Various mercaptans were complexed with dibutyl tin dilaurate catalyst (T-12 brand catalyst, M & T Chemicals) at 0.2 wt-% tin catalyst based on the solids content of the coating formulation (mercaptan:tin equivalent ratio of 48:1). 80 g. aliquots of the master batch were blended with the various tin/mercaptan complexes and the viscosity measured at various time intervals thereafter (#2 spindle at 60 rpm). In other tests, it has been determined that at the level of tin catalyst used, the pot life of this formulation with tin catalyst only (no mercaptan) would be much less than 1 hour and typically on the order of 10–20 minutes. The following results were recorded.

TABLE 1

4497-147 Series

| Mercaptan | Viscosity (cps)* | | | | | |
|---|---|---|---|---|---|---|
| | 0 h. | 3 h. | 5 h. | 7 h. | 22 h. | 55 h. |
| Uncatalyzed | 46 | 48 | 49 | 53 | 63 | 130 |
| TrimethylolpropaneTri-(3-mercaptopropionate) | 46 | 52 | 57 | 58 | AG | G |
| Pentaerythritol tetra-(3-mercaptopropionate) [PTM] | 48 | 53 | 59 | 61 | G | |
| Glycol di-(3-mercaptopropionate) [GDP] | 45 | 52 | 60 | 64 | G | |
| Glycol di-(3-mercaptoacetate)[GDA] | 45 | 52 | 57 | 58 | G | |
| Trimethylolpropane Trithioglycolate | 45 | 56 | 61 | 62 | G | |
| Mercaptodiethylether | 45 | 49 | 53 | 52 | 77 | G |
| Ethanedithiol | 47 | 52 | 63 | 68 | G | |
| Thiolactic Acid | 52 | 127 | 425 | G | | |
| Mercaptopropionic acid | 50 | 94 | 158 | 222 | G | |
| Thiophenol | 44 | 52 | 54 | 57 | 96 | G |
| Thioacetic | 70 | AG | G | | | |
| 2-Mercaptoethanol | 46 | 48 | 52 | 52 | 63 | 133 |
| GDP + Acetic Acid | 51 | 62 | 71 | 78 | G | |

*AG = Almost Gelled
G = Gelled

The above-tabulated data demonstrate that a wide variety of mercaptans successfully complex with tin catalysts. It is noted that carboxyl functionality appears to shorten the pot life of the formulation.

EXAMPLE II

Various tin catalysts were complexed with GDP (see Example I) and evaluated with a master formulation of DESMOPHEN 800 polyol (a polyester polyol, 100% nv solids, OH number 290, Mobay Chemical Co., 55.8 g), DESMODUR N3390 polyisocyanate (43.2 g), methyl amyl ketone/butyl acetate solvent (MAK/-BAc=½ volume ratio, 20 g). To each of several lots of this master formulation was added the following:

TABLE 2

| Formulation No. | Additive (g) |
|---|---|
| 4497-84A Control | DESMOPHEN 800(2.6) |
| 4497-84B Control | GDP(1.6) |
| 4497-85A | 10% Dibutyl tin acetate in GDP (1.76) |
| 4497-85B | 10% Dibutyl tin oxide in GDP (1.76) |
| 4497-86B | Dibutyl tin dilaurate (1)/GDP (9)/MAK (5)/(2.64) |

Viscosity measurements were taken (as described in Example I) with the following results being recorded.

TABLE 3

| | Time (cps) | | |
|---|---|---|---|
| Form No. | Init. | 4 hrs. | 21 hrs. |
| 4497-84A | 80 | 87 | 169 (24 hrs) |
| 4497-84B | 75 | 80 | 154 (24 hrs) |
| 4497-85A | 80 | 98 | G |
| 4497-85B | 70 | 102 | G |
| 4497-86B | 70 | 83 | G |

These results demonstrate that various forms of tin catalysts can have their catalytic activity delayed by complexing with a mercaptan. Note that Formulation No. 4497-86A (not reported above) containing 10% Sn(II) octoate in GDP (1.76 g) evidenced a white precipitate which dissolved and an exotherm was noted. This formulation thickened slightly but did not gel. No attempt was made to confirm this run and it is reported here for completeness.

Each of the formulations was sprayed onto glass by the vapor injection spray process of U.S. Pat. No. 4,517,222 using 0.5 wt-% dimethylethanol amine (DMEOLA) catalyst followed by a post-cure thermal bake for 5 minutes at 82.2° C. (180° F.). Neither control Formulation 84A or 84B was tack free following the post-cure thermal bake. Formulations 85A, 85B, and 86B all were tack free following the post-cure thermal bake, indicating that the amine catalyst had activated the tin catalyst. The basic formulation (polyester polyol and polyisocyanate) results in a soft cured film so that performance properties (MEK rubs, pencil hardness, etc.) are not important. Of importance is the ability to delay the catalytic activity of tin catalysts and to activate their activity readily and on demand with the amine activator.

EXAMPLE III

The effect of tin concentration (tin supplied from a tin/mercaptan complex) in a polyol/polyisocyanate formulation was investigated both as to pot life (viscosity) and performance of the cured coating (MEK rubs). The following formulations were made.

TABLE 4

| | Formulation No. (g) | | | | |
|---|---|---|---|---|---|
| Ingredient | 4497-106* | 4497-105B | 4497-105A | 4497-104B | 4497-104A |
| DESMOPHEN 800 | 55.8 | 55.8 | 55.8 | 55.8 | 55.8 |
| DESMODUR N3390 | 44.5 | 43.8 | 43.1 | 41.6 | 38.7 |
| MAK/BAc Solvent (1:2 vol. ratio) | 20.0 | 20.0 | 20.0 | 20.0 | 20.0 |
| Tin/Mercaptan** Complex | — | 0.66 | 1.32 | 2.64 | 5.28 |
| % Catalyst (on solids) | — | 0.057 | 0.115 | 0.23 | 0.46 |
| NCO/OH(SH) = 1.1 | | | | | |

*only MAK solvent
**Dibutyl tin dilaurate (1 g)/GDP (9 g)/MAK (5 g)

The following viscosity data was reported (#2 spindle, 60 rpm).

TABLE 5

| | Viscosity (cps) | | | |
|---|---|---|---|---|
| Formulation | Init | 6 hr. | 24 hr. | % Increase at 6 hr. |
| 4497-106 | 75 | 82 | 147 | 9.3 |
| 4497-105B | 72 | 93 | G | 29.2 |
| 4497-105A | 73 | 96 | G | 31.5 |
| 4497-104B | 68 | 88 | G | 29.4 |
| 4497-104A | 63 | 99 | G | 57.1 |

The above-tabulated data demonstrates that the level of tin catalyst does affect pot life, but not that substantially at 6 hours for the formulation tested. At the tin levels tested sprayable viscosity was maintained for in excess of 6 hours (about 1 shift).

Each of the coatings was vapor injection cure sprayed onto glass as in Example II with 0.5 wt-% DMEOLA catalyst. The following performance data was recorded.

TABLE 6*

| | RT-1 | | | | | HT-1 | | | | | HT-2 | | | | |
|---|---|---|---|---|---|---|---|---|---|---|---|---|---|---|---|
| Test | 106 | 105B | 105A | 104B | 104A | 106 | 105B | 105A | 104B | 104A | 106 | 105B | 105A | 104B | 104A |
| Tack Free Hot | — | — | — | — | — | N | Y | Y | Y | Y | N | Y | Y | Y | Y |
| Tack Free (hr) | >3 | 1-3 | 1-3 | 1-3 | 0.63 | — | — | — | — | — | — | — | — | — | — |
| 1 Hr. MEK | — | — | — | — | 10 | — | 13 | 35 | 60 | 95 | — | 35 | 66 | 100 | 100 |
| 1 Hr. Pencil | — | — | — | — | 6B | — | 6B | 6B | 6B | 6B | — | 6B | 6B | 6B | 6B |
| MEK** Rubs | T | 100 | 100 | 100 | 100 | T | 100 | 100 | 100 | 100 | T | 100 | 100 | 100 | 100 |
| Sward | T | 10,12 | 8,8 | 10,8 | 6,6 | T | 14,12 | 10,10 | 10,10 | 6,8 | T | 18,20 | 12,12 | 12,12 | 6,6 |
| Pencil | T | 4B | 4B | 6B | 6B | T | 4B | 4B | 5B | 6B | T | 4B | 3B | 4B | 6B |
| $H_2O$ | — | F | P | P | P | — | P | P | F | F | — | F | P | F | F |
| NaOH | — | F | F | F | P | — | P | F | F | P | — | P | F | P | F |
| $H_2SO_4$ | — | F | P | P | P | — | P | P | P | P | — | P | P | P | F |

TABLE 6*-continued

| Test | RT-1 | | | | | HT-1 | | | | | HT-2 | | | | |
|---|---|---|---|---|---|---|---|---|---|---|---|---|---|---|---|
| | 106 | 105B | 105A | 104B | 104A | 106 | 105B | 105A | 104B | 104A | 106 | 105B | 105A | 104B | 104A |
| Xylene | — | P | P | P | P | — | P | P | P | F | — | P | P | P | F |

Figure 2:
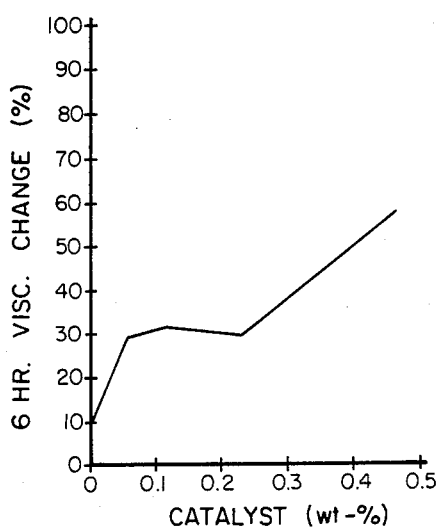
FIG. 2 graphically portrays percent 6 hour viscosity change versus catalyst concentration for the coating composition of Example III.

Note: All data for MEK rubs, Sward hardness, and solvent resistance is for final film properties (1 day)
*RT-1 is for a panel held at room temperature for 24 hours
HT-1 is for a panel heated at 82.2° C. (180° F.) for 5 min.
HT-2 is for a panel heated at 121.1° C. (250° F.) for 5 min.
T means Tacky, P means Pass, F means Fail, N means no, Y means yes
Sward: Plate glass is defined as 100
Solvent Tests: $H_2O$, NaOH, $H_2SO_4$, or xylene as a pool on coating is placed under watch glass for 24 hours under RT-1, HT-1, or HT-2 conditions and the solvent resistance judged
**MEK Rubs-Test stopped at 100 double rubs The above-tabulated data again demonstrates that an amine activator will activate the tin in a tin/mercaptan catalyst for effecting cure of a polyol/polyisocyanate coating composition. This data also demonstrates that cure of the coating is accelerated by increased levels of tin catalyst up to a point. This trend can be seen from FIGS. 1 and 2 which graphically portray the 6 hour viscosity change and 1 hour MEK Rubs, respectively, versus tin concentration.

A sample of 104A was sprayed onto glass using only compressed air (no amine) and then subjected to heating at 82.2° F. for 5 minutes (HT-1). The film was tacky. Another sample of 104A was an air sprayed onto glass (no amine) and then subjected to heating at 121.1° C. for 5 minutes (HT-2). This film was tack free. Performance data on each sample was taken 1 day after application and heating.

TABLE 7

| | Formulation 104A | | | |
|---|---|---|---|---|
| | Air Spray | | Amine Spray | |
| Test | HT-1 | HT-2 | HT-1 | HT-2 |
| MEK Rubs | 62 | 75 | 100+ | 100+ |

This data shows that the tin/mercaptan complex in combination with an amine catalyst is synergistic for cure of the coating as the 82.2°/5 Min. data clearly demonstrates. In fact, even though the coating can be thermally cured, the inventive catalyst system still catalyzed the mixture.

EXAMPLE IV

The effect of tin concentration on a coating containing a very flexible polyester polyol was studied for the dibutyl tin dilaurate catalyst.

TABLE 8

| | Formulation No. (g) | | | | |
|---|---|---|---|---|---|
| Ingredient | 4497-110A | 4497-109B | 4497-109A | 4497-108B | 4497-108A |
| K-FLEX* 188 | 41.7 | 40.9 | 40.2 | 38.9 | 35.0 |
| DESMODUR N3390 | 42.1 | 42.1 | 42.1 | 42.1 | 42.1 |
| Tin/** GDP Complex | — | 0.57 | 1.14 | 2.28 | 5.71 |
| MAK/BAc (1:2) | 27 | 27 | 27 | 27 | 27 |
| % Catalyst Solids*** | 0 | 0.05 | 0.10 | 0.20 | 0.50 |
| NCO/OH(SH) = 1.1/1.0 | | | | | |

*K-FLEX 188 flexible polyester polyol, 100% nv, OH. No. 235, King Industries
**See Table 4, Example III
***wt-% dibutyltin dilaurate on solids Viscosity data was recorded as follows:

TABLE 9

| | Viscosity (cps) | |
|---|---|---|
| Formulation | Init. | 4 Hr. |
| 110A | 62 | G |
| 109B | 61 | G |
| 109A | 57 | G |
| 108B | 53 | G |
| 108A | 46 | G |

A short pot life is a characteristc of the resin of the formulation as they all gelled within 4 hours.

Cure data was collected as described in Example III, Table 6

TABLE 10

| Test | RT-1 | | | | | RT-3 | | | | |
|---|---|---|---|---|---|---|---|---|---|---|
| | 110A | 109B | 109A | 108B | 108A | 110A | 109B | 109A | 108B | 108A |
| Tack Free Hot | — | — | — | — | — | — | — | — | — | — |
| 1 Hr. MEK | — | — | — | — | Tacky | — | — | — | — | — |
| 1 Hr. Pencil | — | — | — | — | Tacky | — | — | — | — | — |
| MEK | 28 | 50 | 78 | 100 | 50 | 68 | 73 | 60 | 100 | 84 |
| Sward | 16,12 | 46,48 | 52,50 | 30,34 | 14,4 | 40,46 | 36,38 | 46,46 | 28,28 | 16,14 |
| Pencil | 5B | 3B | 2B | 3B | 4B | 2B | HB | 2B | B | 4B |
| $H_2O$ | P | — | — | F | — | — | P | P | — | F |
| NaOH | P | — | — | P | — | — | P | P | — | P |
| $H_2SO_4$ | P | — | — | P | — | — | P | P | — | P |
| Xylene | P | — | — | P | — | — | P | P | — | P |
| Tack Free Hot | N | Y | Y | Y | Y | Y | Y | Y | Y | Y |
| 1 Hr. MEK | tacky | 31 | 37 | 70 | 75 | 19 | 25 | 52 | 64 | 50 |
| 1 Hr. Pencil | tacky | 5B | 6B | 4B | 6B | 5B | 3B | 5B | 3B | 5B |
| MEK | 27 | 50 | 100 | 100 | 97 | 65 | 60 | 73 | 83 | 80 |
| Sward | 20,20 | 52,52 | 36,40 | 42,40 | 22,22 | 38,40 | 62,58 | 48,52 | 62,56 | 28,30 |
| Pencil | 5B | 2B | 2B | 2B | 5B | 4B | 2B | 2B | 2B | 2B |
| $H_2O$ | P | P | P | P | F | F | P | F | F | F |
| NaOH | P | P | P | P | P | P | F | P | P | F |
| $H_2SO_4$ | P | P | P | P | P | P | P | P | P | P |
| Xylene | P | P | P | P | P | P | P | P | P | F |

Figure 3:
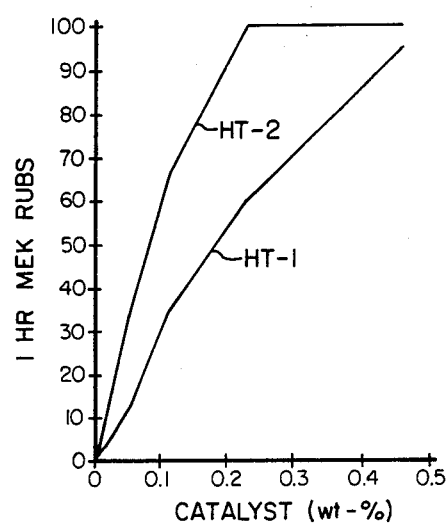
FIG. 3 graphically portrays 1 hour MEK rub data versus catalyst concentration for the coating composition of Example III.

The formulation without catalyst will not cure until heated at 121.1° C. for 5 minutes. Yet with the inventive catalyst system, cure is evident with heating at 82.2° C. for 5 minutes. This can be seen by reference to FIG. 3 which graphically portrays the 1 Hr. MEK rub data set forth above.

EXAMPLE V

Tests were conducted on a slow curing acrylic polyol with and without the use of a mercaptan in order to demonstrate the effect of the complex and amine. A master batch formulation was made as follows.

TABLE 11

| Ingredient | Weight (g) |
|---|---|
| JONCRYL 500 (acrylic polyol 80% n.v. solids, OH no. 112, S.C. Johnson & Son, Inc.) | 167 |
| DESMODUR N3390 | 79 |
| MAK | 40 |
| BAc | 40 |

Portions of the master batch were used with different dibutyltin dilaurate catalyst levels as follows:

TABLE 12

| Test No. | Type* | Weight (g) | % T-12 Brand on Solids |
|---|---|---|---|
| J1-J8 | None-Control | — | — |
| K1-K8 | 5% T-12 in MAK/BAc (1:1 by wt.) | 0.82 | 0.02 |
| K9-K16 | 5% T-12 in MAK/BAc (1:1 by wt.) | 1.64 | 0.04 |
| K17-K24 | 5% T-12 in MAK/BAc (1:1 by wt.) | 3.28 | 0.08 |
| L1-L8 | T-12/GDP/MAK/BAc (1 g/9 g/10 g/10 g) | 1.24 | 0.02 |
| L9-L16 | T-12/GDP/MAK/BAc (1 g/9 g/10 g/10 g) | 2.48 | 0.04 |
| L-17-L24 | T-12/GDP/MAK/BAc (1 g/9 g/10 g/10 g) | 4.97 | 0.08 |

*T-12 brand dibutyltin dilaurate, see Example I
T-12/GDP/MAK, see Example II

All formulations were sprayed under the following conditions:

TABLE 13

| | |
|---|---|
| AIR-RT: | Coating sprayed with air (no amine) and dried at ambient indoor room temperature |
| VIC-RT: | Coating sprayed with DMEOLA catalyst in accordance with U.S. Pat. No. 4,517,222 and dried at ambient indoor room temperature (VIC is a registered trademark of Ashland Oil Co.) |
| AIR-HT1: | Coating sprayed with air (no amine) and then baked at 65.5° C. (150° F.) for 10 minutes |
| AIR-HT2: | Coating sprayed with air (no amine) and then baked at 82.2° C. (180° F.) for 10 minutes |
| AIR-HT3: | Coating sprayed with air (no amine) and then baked at 98.8° C. (210° F.) for 10 minutes |
| VIC-HT1: | Coating sprayed with DMEOLA catalyst as in VIC-RT and then baked at 65.5° C. (150° F.) for 10 minutes |
| VIC-HT2: | Coating sprayed with DMEOLA catalyst as in VIC-RT and then baked at 82.2° C. (180° F.) for 10 minutes |
| VIC-HT3: | Coating sprayed with DMEOLA catalyst as in VIC-RT and then baked at 98.8° C. (210° F.) for 10 minutes |

In one series of tests (K1-K24) the formulations contained dibutyltin dilaurate catalyst (T-12 brand) and no mercaptan resin. In the second series of tests (L1-L24) the formulations contained the tin mercaptan complex of Table 4, Example III. Catalyst levels included 0%, 0.02%, 0.04%, and 0.08% (all percentages by weight).

Pot life data was recorded as well as MEK rub data at the following time intervals following application: 5 minutes, 1 hour, 4 hours, and 24 hours. The coatings also were tested for being tack free and the time recorded. A control series (J1-J8) with no tin catalyst, no mercaptan, and no amine also was run for completeness.

TABLE 14

| Test No. | Spray Mode | Tack* Free (hr) | Pot Life (hr) | MEK RUBS** Time After Application | | | |
|---|---|---|---|---|---|---|---|
| | | | | 5 min. | 1 Hr. | 4 Hrs. | 24 Hrs. |
| Control | | | | | | | |
| J1 | AIR-RT | >24 | — | — | — | — | — |
| J2 | VIC-RT | >24 | — | — | — | — | — |
| J3 | AIR-HT1 | >24 | — | — | — | — | — |
| J4 | AIR-HT2 | >24 | — | — | — | — | — |
| J7 | VIC-HT | >24 | — | — | — | — | — |
| J5 | AIR-HT3 | >24 | — | — | — | — | — |
| J8 | VIC-HT3 | >24 | — | — | — | — | — |
| 0.02% Catalyst | | | | | | | |
| K1 | AIR-RT | >4 | 0.75 | — | — | — | 20 |
| L1 | AIR-RT | >4 | 3 | — | — | — | 12 |
| K2 | VIC-RT | >4 | 0.75 | — | — | — | 25 |
| L2 | VIC-RT | >4 | 3 | — | — | — | 20 |
| K3 | AIR-HT1 | 24 | 0.75 | — | — | — | 35 |
| L3 | AIR-HT1 | >4 | 3 | — | — | — | 15 |
| K6 | VIC-HT1 | <4 | 0.75 | — | — | — | 30 |
| L6 | VIC-HT1 | <4 | 3 | — | — | — | 30 |
| K4 | AIR-HT | <4 | 0.75 | — | 3 | 25 | 45 |
| L4 | AIR-HT2 | <4 | 3 | — | — | 3 | 25 |
| K7 | VIC-HT2 | TFO | 0.75 | 2 | 8 | 40 | 70 |
| L7 | VIC-HT2 | 5-10 min. | 3 | 1 | 8 | 8 | 45 |
| K5 | AIR-HT3 | TFO | 0.75 | 5 | 18 | 55 | 60 |
| L5 | AIR-HT3 | 20 min. | 3 | 4 | 7 | 15 | 25 |
| K8 | VIC-HT3 | TFO | 0.75 | 10 | 30 | 80 | 80 |
| L8 | VIC-HT3 | TFO | 3 | 8 | 30 | 25 | 60 |
| 0.04% Catalyst | | | | | | | |
| K9 | AIR-RT | >4 | 0.5 | — | T | T | 30 |
| L9 | AIR-RT | >4 | 3.5 | — | — | — | 20 |
| K10 | VIC-RT | >4 | 0.5 | — | T | T | 40 |
| L10 | VIC-RT | >4 | 3.5 | — | — | — | 30 |
| K11 | AIR-HT1 | <4 | 0.5 | — | 3 | 20 | 50 |
| L11 | AIR-HT1 | >4 | 3.5 | — | — | — | 20 |
| K14 | VIC-HT1 | <1 | 0.5 | — | 2 | 30 | 50 |
| L14 | VIC-HT1 | 0.75 | 3.5 | — | 2 | 10 | 45 |
| K12 | AIR-HT2 | ~1 | 0.5 | 8 | 15 | 34 | 45 |
| L12 | AIR-HT2 | 0.75 | 3.5 | — | 2 | 8 | 35 |
| K15 | VIC-HT2 | TFO | 0.5 | 12 | 20 | 70 | 60 |
| L15 | VIC-HT2 | TFO | 3.5 | 12 | 20 | 20 | 45 |
| K13 | AIR-HT3 | TFO | 0.5 | 15 | 40 | 65 | 80 |
| L13 | AIR-HT3 | TFO | 3.5 | 10 | 10 | 26 | 50 |
| K16 | VIC-HT3 | TFO | 0.5 | 25 | 45 | 75 | 75 |
| L16 | VIC-HT3 | TFO | 3.5 | 30 | 40 | 50 | 60 |
| 0.08% Catalyst | | | | | | | |
| K17 | AIR-RT | <4 | 0.25 | — | — | 5 | 30 |
| L17 | AIR-RT | <4 | 4 | — | — | 2 | 40 |
| K18 | VIC-RT | <4 | 0.25 | — | — | 5 | 35 |
| L18 | VIC-RT | <4 | 4 | — | — | 7 | 40 |
| K19 | AIR-HT1 | TFO | 0.25 | 4 | 10 | 25 | 45 |
| L19 | AIR-HT1 | <4 | 4 | — | — | — | 45 |
| K22 | VIC-HT1 | TFO | 0.25 | 6 | 12 | 20 | 55 |
| L22 | VIC-HT1 | 0.5 | 4 | — | 5 | 15 | 40 |
| K20 | AIR-HT2 | TFO | 0.25 | 25 | 20 | 55 | 70 |
| L20 | AIR-HT2 | <4 | 4 | — | — | 5 | 55 |
| K23 | VIC-HT2 | TFO | 0.25 | 20 | 32 | 58 | 110 |
| L23 | VIC-HT2 | TFO | 4 | 12 | 20 | 25 | 50 |
| K21 | AIR-HT3 | TFO | 0.25 | 65 | 90 | 100 | 130 |
| L21 | AIR-HT3 | TFO | 4 | 4 | 5 | 40 | 80 |
| K24 | VIC-HT3 | TFO | 0.25 | 40 | 80 | 85 | 100 |
| L24 | VIC-HT3 | TFO | 4 | 19 | 35 | 50 | 80 |

Figure 4:
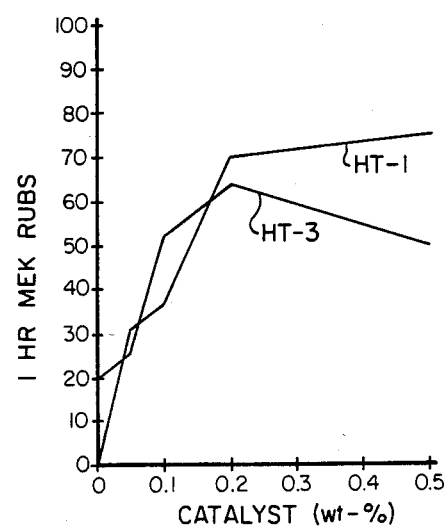
FIG. 4 graphically portrays 1 hour MEK rub data versus catalyst concentration for the coating composition of Example IV.
Figure 5:
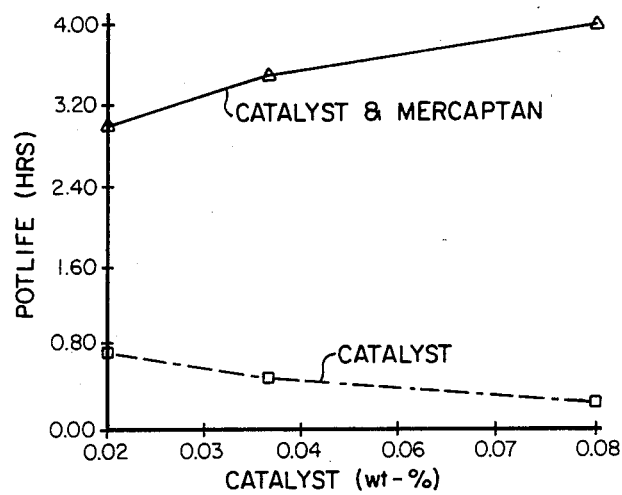
FIGS. 5–7 graphically portray pot life data and MEK rub data versus catalyst concentration for the coating compositions of Example V with and without the novel tin/mercaptan complex.
Figure 6:
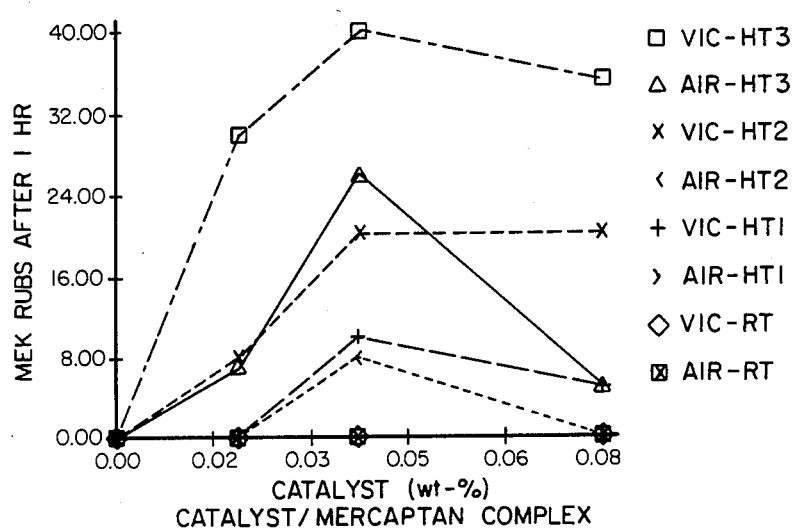
Figure 7:
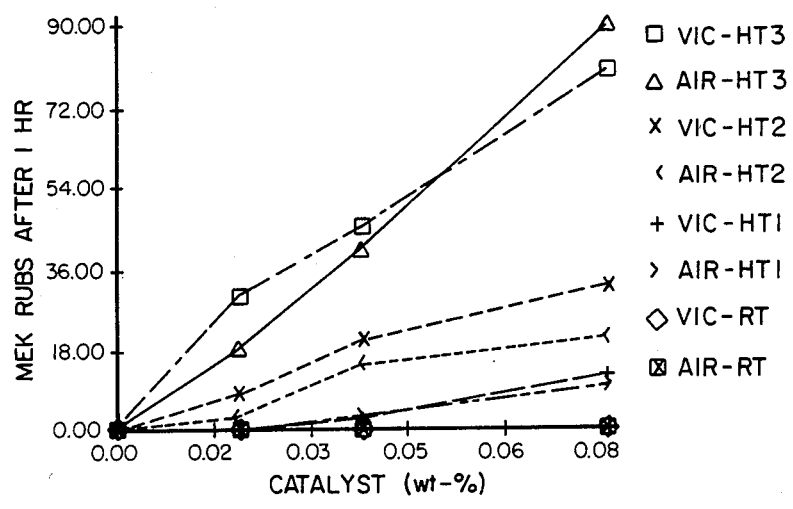

*TFO means that the film was tack free from the oven (sample cooled before testing)
**T means that the film was tacky It will be apparent that the particular formulation chosen is a slow curing composition and that the tin levels studied were too low for good performance to be realized from the formulation. The data, however, is quite convincing that the pot life can be extended when the complex is used and that substantially equivalent performance (both Tack Free test and MEK Rub test) is realized at equivalent dibutyltin dilaurate levels and heating conditions when using only the tin catalyst and when using the tin/mercaptan complex. This performance equivalence can be seen in FIGS. 4–6 which graphically portray 1 hour MEK Rub data and pot life data versus catalyst concentration with and without mercaptan for each of the heating conditions tested.

EXAMPLE VI

An advantageous embodiment of the present invention involves the use of a resin which contains both hydroxyl functionality and mercapto functionality. The addition of a tin catalyst results in a unique delayed-action, self-catalyzed resin which can be added to a polyisocyanate to make a unique urethane-forming coating composition. Synthesis of such a resin is not routine and preferably is conducted in accordance with the Dammann synthesis as disclosed in commonly-assigned U.S. Pat. No. 4,732,945, and is incorporated expressly herein by reference. This synthesis involves the formation of a glycidyl-functional polyol (e.g. acrylic polyol) in a first stage followed by the addition of mercapto-compound containing carboxyl or other functionality reactive with the glycidyl groups of the first stage reaction product.

The following ingredients were used:

TABLE 15

Resin 4497-163

| | Weight Parts |
|---|---|
| Part A | |
| Ethyl 3-ethoxypropionate | 180 |
| Part B | |
| Butyl acrylate (3 moles) | 384 |
| Glycidyl methacrylate (0.3 moles) | 42.6 |
| Hydroxyethyl methacrylate (1 mole) | 130 |
| Part C | |
| Di-t-butyl peroxide | 5.4 |
| Ethyl 3-ethoxypropionate | 50 |
| Part D | |
| Mercaptopropionic acid (0.25 mole) | 26.5 |

The procedure utilized involved heating Part A to 165° C. and adding 10 wt-% of Part C, and 80 wt-% of Part C and Part B over a one hour period. This mixture was held for 15 minutes and 5 wt-% of Part C was added. This mixture was held for another 1 hour followed by the addition of 5 wt-% of Part C. This mixture was held for 2 hours to produce a glycidyl-functional acrylic polyol. The reaction mixture then was cooled to 150° C., Part D was added, and the reaction mixture held for one hour to produce a resin which analyzed as follows.

TABLE 16

Resin 4497-163

| | |
|---|---|
| Non-volatiles | 70.4 wt-% |
| OH No. | 95 |
| Acid No | 7.5 |
| Water | 0.35 wt-% |
| Viscosity | 5.7 Stokes |
| Gardner Color | 1 − |
| Density | 8.82 lb/gal |

TABLE 16-continued

Resin 4497-163

| | |
|---|---|
| Molecular Number Average | 2860 |
| Molecular Weight Average | 10,000 |
| SH | 16.7 wt-% |
| Secondary OH | 16.7 wt-% |
| Primary OH | 66.6 wt-% |

One control formulation and one inventive formulation were compounded as follows:

TABLE 17

| Number | Ingredient | Amount (wt-parts) |
|---|---|---|
| Control | | |
| 4497-173A | Resin 4497-163 | 64.1 |
| | Desmodur N3390 | 25.8 |
| | MAK/BAc | 25.0 |
| Inventive | | |
| 4497-172A | Resin 4497-163 | 64.1 |
| | Desmodur N3390 | 25.8 |
| | MAK/BAc | 25.0 |
| | Dibutyltin dilaurate solution* | 0.68 |
| | SH:Sn = 268:1 | |

*10% dibutyltin dilaurate (T-12 brand) in ethyl 3-ethoxypropionate, 0.1 wt % catalyst based on non-volatile solids Each formulation was tested for pot life and then was sprayed onto glass panels with DMEOLA catalyst as in the previous examples.

TABLE 18A

| No. | 3 Hr. % Visc. Increase |
|---|---|
| 173A-no Tin | 24 |
| 172A-with Tin | 27 |

TABLE 18B*

| | RT-1 | | RT-3** | | HT-1 | |
|---|---|---|---|---|---|---|
| Test | 173A | 172A | 173A | 172A | 173A | 172A |
| TFH | — | — | — | — | N | Y |
| Tack Free (min) | 60 | 60 | — | — | — | — |
| 1 hr. MEK | — | 6 | — | — | — | 14 |
| 1 hr. Pencil | — | 6B | — | — | — | H |
| MEK | 21 | 24 | 22 | 45 | 8 | 27 |
| Sward | 10,10 | 16,18 | 10,14 | 18,18 | 8,10 | 22,20 |
| Pencil | HB | H | HB | H | B | H |

*See Table 6, Example III
**RT-3 is for a panel held at room temperature for 72 hours.

The above-tabulated data demonstrates that a multi-functional resin can be designed and synthesized. Performance of the resin was not optimized in this example as the curing chemistry was of prime interest. The curing chemistry was confirmed, viz. that a single resin can bear hydroxyl functionality and mercaptan functionality for complexing with the tin catalyst.

EXAMPLE VII

An acrylic polyol, 4431-160, was prepared from hydroxyethyl acrylate (1.5 m), butyl methacrylate (2.0 m) and butyl acrylate (1.0 m) using di-t-butyl peroxide catalyst and ethyl 3-ethoxypropionate solvent: OH no. 104, acid number 1.87, 71.7 wt-% n.v. solids, 0.1% $H_2O$, Gardner color 1-, Stokes viscosity 10.1 cps, density 8.81 lg/gal, and equivalent weight 539.4. A white urethane-forming topcoat paint was formulated in conventional fashion (e.g. ball milling, etc.) as follows:

TABLE 19

Paint 4431-166

| Ingredient | Wt-Parts |
|---|---|
| Part A | |
| Ball Mill | |
| Polyol 4431-160 | 150.0 |
| DuPont R-960 TiO$_2$ pigment | 500.0 |
| Butyl acetate | 200.0 |
| CAB-551-0.2 cellulose acetate butyrate (Eastman Chemicals) | 10.5 |
| Letdown | |
| Polyol 4431-160 | 350.0 |
| Ethyl 3-ethoxypropionate | 50.0 |
| Tinuvin 328 light stabilizer (hydroxy phenyl benzotriazole based stabilizer, Ciba-Gigy Co.) | 4.0 |
| Byk 300 mar aid (silicone resin, Byk Chemie) | 0.5 |
| Irganox 1010 anti-oxidant (hindered phenol type, Ciba-Gigy Co.) | 0.4 |
| Part B | |
| Desmodur N3390 polyisocyanate | 23.1 |
| Butyl acetate | 10.0 |

Several conventional tin mercaptide catalysts were tested along with the inventive tin/mercaptan complex catalyst. Excess mercaptin was used with the conventional tin mercaptide catalysts in order to demonstrate this embodiment of the invention.

TABLE 20

| Catalyst No. | Ingredients | Amt (g) | SH/Tin Mole Ratio |
|---|---|---|---|
| 4431-175A | Dibutyltin dilaurate | 1 | 48:1 |
| | GDP | 9 | |
| | Butylacetate | 20 | |
| | Ethyl 3-ethoxypropionate | 10 | |
| 4431-175B | Dibutyltin dilaurate | 1 | N/A |
| | Butylacetate | 29 | |
| | Ethyl 3-ethoxypropionate | 10 | |
| 4431-175C | T-125 tin mercaptide (M & T Chemicals) | 1.09 | 5.6:1 |
| | GDP | 1 | |
| | Butylacetate | 28 | |
| | Ethyl 3-ethoxypropionate | 10 | |
| 4431-175D | T-125 tin mercaptide | 1.09 | N/A |
| | Butylacetate | 29 | |
| | Ethyl 3-ethoxypropionate | 10 | |
| 4431-175E | T-131 tin mercaptide | 1.03 | 5.6:1 |
| | GDP | 1 | |
| | Butylacetate | 28 | |
| | Ethyl 3-ethoxypropionate | 10 | |
| 4431-175F | T-131 tin mercaptide | 1.03 | N/A |
| | Butylacetate | 29 | |
| | Ethyl 3-ethoxypropionate | 10 | |

Complete catalyzed paint formulations based on Paint 4431-166 and the foregoing catalyst solutions were prepared as follows:

TABLE 21*

| Catalyzed Paint | Ingredient | Weight (g) |
|---|---|---|
| 4431-177A | Paint 4431-166 Part A | 136.5 |
| | Paint 4431-166 Part B | 33.1 |
| | EEP/BuAc (1:1 by wt)** | |
| 4431-177B | Paint 4431-166 Part A | 136.5 |
| | Paint 4431-166 Part B | 33.1 |
| | Catalyst No. 175A | 1.5 |
| | EEP/BuAc | 6.0 |
| 4431-177C | Paint 4431-166 Part A | 136.5 |
| | Paint 4431-166 Part B | 33.1 |
| | Catalyst No. 175B | 1.5 |
| | EEP/BuAc | 6.0 |
| 4431-181A | Paint 4431-166 Part A | 136.5 |
| | Paint 4431-166 Part B | 33.1 |
| | Catalyst No. 175C | 1.5 |
| | EEP/BuAc | 6.0 |
| 4431-181B | Paint 4431-166 Part A | 136.5 |
| | Paint 4431-166 Part B | 33.1 |
| | Catalyst No. 175D | 1.5 |
| | EEP/BuAc | 6.0 |
| 4431-191A | Paint 4431-166 Part A | 136.5 |
| | Paint 4431-166 Part B | 33.1 |
| | Catalyst No. 175E | 1.5 |
| | EEP/BuAc | 6.0 |
| 4431-191B | Paint 4431-166 Part A | 136.5 |
| | Paint 4431-166 Part B | 33.1 |
| | Catalyst No. 175F | 1.5 |
| | EEP/BuAc | 6.0 |

*6 drops of a 25 wt % FC-430 solution in MEK added to all paints, FC-430 surfactant being a non-ionic fluorocarbon surfactant, Minnesota Mining & Manufacturing Company, St. Paul, Minnesota
**EEP is ethyl 3-ethoxypropionate
BuAc is butylacetate The pot life data on the above-tabulated catalyzed paints was recorded as follows:

TABLE 22

| Catalyzed Paint | Vicosity (cps)[1] | | | | | | | | |
|---|---|---|---|---|---|---|---|---|---|
| | Init | 1 hr | 2 hrs | 3 hrs | 4 hrs | 5 hrs | 7 hrs | 8 hrs | 24 hrs |
| 4431-177A | 56 | 56 | 56 | — | 56 | 56 | 59 | 59 | 69 |
| 4431-177B | 56 | 56 | 59 | — | 59 | 59 | 64 | 61 | Gel |
| 4431-177C | 56 | Gel[2] | — | — | — | — | — | — | — |
| 4431-181A | 61 | 68 | 121 | Gel | — | — | — | — | — |
| 4431-181B | 67 | Gel[3] | — | — | — | — | — | — | — |
| 4431-191A | 58 | 57 | 68 | 112 | Gel | — | — | — | — |
| 4431-191B | 56 | 71 | 176 | Gel[4] | — | — | — | — | — |

[1] #3 spindle at 30 rpm
[2] 100 cps at 45 min, Gel at 1 hour
[3] Gel at 30 min.
[4] Gel at 2 hr. 40 min.

This data clearly demonstrates that the inventive Sn/SH catalyzed paint, 4431-177B, retained excellent pot life of the paint 4431-177A, without catalyst, while the paint containing the tin catalyst only, 4431-177C, had a very short pot life. Addition of excess mercaptan to the T-125 brand tin mercaptide catalyzed paint resulted in about a two-fold increase in pot life (compare Paints 4431-181A and 4431-181B). Addition of excess mercaptan to the T-131 brand tin mercaptide catalyzed paint resulted in about a 2-fold increase in pot life (compare Paints 4431-191A and 4431-191B). With even a greater excess of mercaptan added in Paint 4431-191A, likely even longer pot lives should be attainable. Nevertheless, the unique ability to increase the pot life of tin mercaptide catalyzed paints is demonstrated.

Cure response data for each of the catalyzed paints was determined by air spraying and VIC spraying with 0.5 wt-% DMEOLA catalyst at 50 psi followed by tempering at room temperature for 2 minutes followed by heating at 82.2° C. (180° F.) for 5 minutes (see Table 11, Example V). The following data was recorded.

TABLE 23

| Test | 177A Control VIC | 177B AIR | 177B VIC | 177C AIR | 177C VIC | 181A AIR | 181A VIC | 181B AIR | 181B VIC | 191A AIR | 191A VIC | 191B AIR | 191B VIC |
|---|---|---|---|---|---|---|---|---|---|---|---|---|---|
| TFO | N | Almost Mars | Y No Mars | Y No Mars | Y No Mars | Y Soft | Y Sl. Soft | Y Sl. Soft | Y Sl. Soft | N Sl. Tacky | Y Almost | N Sl. Tacky | Y Almost |
| Sward (at 5 min) | not cured | 1,2 | 4,5 | 5,5 | 6,7 | 2,2 | 5,6 | 2,3 | 6,7 | 1,2 | 3,3 | 2,2 | 3,3 |
| Sward (at 1 hr) | not cured | 3,3 | 4,5 | 6,5 | 6,7 | 4,4 | 7,9 | 3,3 | 9,9 | 3,3 | 4,4 | 3,3 | 5,4 |
| Sward (at 24 hrs) | 5,6 | 15,15 | 15,16 | 14,15 | 22,21 | 15,16 | 14,15 | 15,13 | 15,17 | 9,11 | 14,12 | 9,9 | 14,14 |
| MEK Rubs (at 5 min) | 1 | 65 | 100+ | 100+ | 100+ | 100+ Softens | 100+ Softens | 100+ Softens | 100+ Softens | 95 Soft | 100+ Softens | 100+ Soft | 100+ Softens |
| MEK Rubs (at 1 hr) | 1 | 100+ Softens | 100+ | 100+ | 100+ | 100+ Softens | 100+ Softens | 100+ Softens | 100+ Softens | 100+ Softens | 100+ Softens | 100+ Softens | 100+ Softens |
| MEK Rubs (at 24 hrs) | 100+ | 100+ | 100+ | 100+ | 100+ | 100+ | 100+ | 100+ | 100+ | 100+ | 100+ | 100+ | 100+ |

*Sl. soft = slightly softens the film

Catalyzed Paint 177B with the inventive tin/mercaptan complex performed equivalent to Catalyzed Paint 177C (which had tin catalyst but no mercaptan), but had a much longer pot life. The presence of mercaptan in comparative Catalyzed Paints 181A and 191A with tin mercaptide catalysts increased the pot life over Catalyzed Paints 181B and 191B which had no mercaptan, while the cure response was promoted by the amine activator. Thus, the uniqueness of the tin/mercaptan complex with its fast cure response in the presence of amine and its extended pot life is established.

With respect to the coatings which were air sprayed and then baked, it will be observed that the inactivated tin catalyst complex also was released for providing cure of the applied paints. The heating schedule, viz. 82.2° C. for 5 minutes, is less severe than is required for uncatalyzed equivalent paints. For example, in order to get the degree of cure for the low bake, air sprayed paints as represented in Table 23, equivalent uncatalyzed paints would have to be baked at about 121.1° C. (250° F.) for about 20 minutes. Thus, it will be observed that heat also establishes fast cure response of the tin/mercaptan complexes of the present invention.

EXAMPLE VIII

The flexibility of the inventive tin/mercaptan catalyst complex is apparent by its ready adaptability for use in present commercial two-pack urethane coatings which are transformed into long pot life formulations. In this example, IMRON 817U coating was evaluated (IMRON coating being a 2-pack urethane white automobile refinish topcoat, E. I. DuPont de Nemeurs and Co.). The formulations were compounded as follows:

TABLE 24

| Formuation No. | Ingredient* | Wt Parts |
|---|---|---|
| Control 4574-44B | IMRON 817U Part A | 82.5 |
| | IMRON 192S Actvator | 27.5 |
| | IMRON 189S Accelerator | 3.4 |
| Comparatve Tin 4574-44C | IMRON 817U Part A | 82.5 |
| | IMRON 192S Activator | 27.5 |
| | 5% dibutyltin dilaurate in EEP | 0.44 |
| Inventive 4574-44A | IMRON 817U Part | 82.5 |
| | IMRON 192S Activator | 27.5 |
| | Dibutyltin dilaurate (1 g)/ GDP (9 g)/MAK (10 g)/BAc(10 g) | 0.66 |
| Inventive 4599-155E | IMRON 817U Part A | 82.5 |
| | IMRON 192S Activator | 27.5 |
| | IMRON 189S Accelerator (30 g)/ | 3.85 |

TABLE 24-continued

| Formuation No. | Ingredient* | Wt Parts |
|---|---|---|
| | GDP (4 g) | |

*Part A is the poyol and the activator is the polyisocyanate. The 189S accelerator was analyzed to be greater than 99% 2,4-pentanedione. The solids content (0.39%) was found to be composed of 9.8% tin and 1.9% zinc. The overall calculated tin and zinc levels in 189S accelerator are 0.04% tin and 0.007% zinc. For comparison, the tin content of the cataylst solution used in 4574-44A is about 0.6% tin.

The following viscosity data was recorded:

TABLE 25

| Formulation No. | Viscosity (cps) | | | | | | |
|---|---|---|---|---|---|---|---|
| | Init | 1 hr | 4 hrs | 8 hrs | 24 hrs | 30 hrs | 48 hrs |
| Control | 38 | 46 | 47 | 53 | 720 | Gel | — |
| Tin | 45 | Gel at 90 min | — | — | — | — | — |
| Inventive 44A | 43 | 44 | 53 | 53 | 69 | 240 | Gel |
| Inventive 155E | 35 | 35 | 35 | — | 35 | — | 50 |

The above-tabulated data demonstrates the improvement in pot life achieved by the novel tin/mercapto catalyst complex compared to a tin catalyzed formulation and to a tin/ketone catalyst complex. Also demonstrated is the greater affinity which tin has for mercaptans than for ketone chelating agents. This data is significant since it was generated using a conventional commercial paint formulation.

Each of the five formulations was sprayed onto glass with 0.5 wt.-% DMEOLA catalyst and then heated at 82.2° C. (180° F.) for 5 minutes. The control, tested 5 minutes after the bake, passed 120 MEK double rubs while inventive formulation 44A tested at 200 MEK double rubs. The formulation with tin catalyst only (no mercaptan) also possessed 200 MEK double rubs. All five coatings passed 200 MEK double rubs 1 hour after the bake. Inventive formulation 155E was not tested after 5 minutes. The unique balance of extended pot life and cure-on-demand is demonstrated by the foregoing data.

EXAMPLE IX

Additional testing was done to establish relationships between tin catalyst concentration and tin/mercaptan ratios for two different mercaptans: glycol di(3-mercaptopropionate), GDP; and 2-mercaptoethanol, MCE. The basic composition was formulated from TONE 0305 polycaprolactone triol (100% n.v. solids, OH no. 310, Union Carbide Corporation, 258 weight parts), DESMODUR N3390 isocyanate (360 wt parts), and MAK/BAc (1:2 vol. ratio) solvent (231 wt parts).

Dibutyltin dilaurate catalyst was varied from 0.05 wt-% to 0.10 wt-% while the tin/mercaptan weight ratio varied from 1:15 to 1:45. Each formulation was sprayed with 0.5 wt-% DMEOLA catalyst onto glass, heated at 82.2° C. (180° F.) for 5 minutes, and then tested. The following data was recorded.

TABLE 26

| Formulation No. | Mercaptan Type | SN/SH Ratio | Catalyst Level | TFO | Vicosity-4 Hr (% change) | MEK-Rubs 1 Hr |
|---|---|---|---|---|---|---|
| 1 | GDP | 1:15 | 0.05 | Y | 19 | 23 |
| 2 | GDP | 1:15 | 0.10 | Y | 17 | 26 |
| 3 | GDP | 1:45 | 0.05 | N | 2 | 9 |
| 4 | GDP | 1:45 | 0.10 | Almost | 0 | 18 |
| 5 | MCE | 1:15 | 0.05 | N | 69 | 30 |
| 6 | MCE | 1:15 | 0.10 | Y | 60 | 40 |
| 7 | MCE | 1:45 | 0.05 | N | 10 | 14 |
| 8 | MCE | 1:45 | 0.10 | Y | 10 | 51 |

The above-tabulated data shows the subtleties of the invention in several respects. For GDP, it appears that the Sn/SH ratio should be less than 1:45 at the practical levels of tin catalyst tested. At the lower Sn/SH ratio of 1:15, there is no apparent benefit in increasing the tin catalyst levels to above 0.05 wt-%. For MCE, however, the coatings were not tack free from the oven (TFO) at the lower tin catalyst level, but were at the higher tin level. Overall, GDP appeared to be slightly better than MCE in the system evaluated.

EXAMPLE X

Gel data using liquid primary and secondary amines were generated in order to demonstrate the operability of primary and secondary amines. The master batch formulation used is set forth below.

TABLE 27

| Ingredient | Amount (g) |
|---|---|
| Tone 0305 Poyol (See Example I) | 78 |
| DESMODUR N3390 Isocyanate (See Example I) | 102 |
| MAK/BuAc (½ vol. ratio) (See Example II) | 31 |
| Dibutyltin dilaurate (1 g)/ GDP (9 g)/MAK (5 g) | 6.1 |

Samples (17 g) of the master batch were combined with 3 g. at 10 wt-% solution of amine and the gel times recorded.

TABLE 28

| Amine Type and Solvent | Gel Time (min.) |
|---|---|
| Control-no amine | 420 |
| Dimethylethanol amine in MAK/BuAc (1:2 wt ratio) | 9 |
| 2-Amino-2-methylpropanol in | 146 |

TABLE 28-continued

| Amine Type and Solvent | Gel Time (min.) |
|---|---|
| MAK/BuAc (1:2) | |
| Di—N—butyl amine in toluene | 254 |
| Diethanol amine | 322 |

These results show that primary and secondary amines function as activators in the process to release the stabilized inactivated tin (or bismuth) catalyst for the released (active) catalyst to catalyze the cure of the coating composition. These results also show that primary and secondary amines do not function as well as do the preferred tertiary amines. Several other primary and secondary amines were tested. Data is not available for these amines since they and the Control gelled overnight.

EXAMPLE XI

A bismuth/mercaptan catalyst complex was prepared by mixing 0.62 g of Coscat 83 bismuth catalyst (bismuthyl bis-neodecanoate catalyst supplied by Cosan Chemical Corp., Carlstadt, N.J.), 2.04 g of GDP, and 7.34 g of N-methylpyrrolidone solvent. A coating composition was formulated from Joncryl 500 acrylic polyol (236 g), MAK/BAc solvent (½ volume ratio), and the bismuth-/mercaptan complex (3.0 g). An equivalent formulation with the bismuth catalyst uncomplexed (i.e. no mercaptan) had a pot life of less than 10 minutes, while the inventive formulation with the bismuth/mercaptan catalyst complex had a pot life of greater than 4 hours (over a twenty-fold increase in pot life).

The inventive formulation was divided into lots which were air sprayed with and without DMEOLA catalyst followed by either baking at 82.2° C. or standing at indoor ambient temperature. MEK rub resistance data recorded is set forth below.

TABLE 29

| Formulation No. 4599-20 | Post Application Treatment | MEK RUBS 1 Hr. | 24 Hrs. |
|---|---|---|---|
| Air Spray | Ambient | 9 | 200 |
| | 82.2° C. | 109 | 200 |
| DMEOLA Spray | Ambient | 118 | 200 |
| | 822° C. | 200 | 200 |

The foregoing data demonstrates that bismuth catalysts can be complexed for improving the pot life of polyol/polyisocyanate coatings. This data also demonstrates that the bismuth/mercaptan catalyst complex is activated by an amine catalyst as well as is thermally activated.

EXAMPLE XII

Various phenolic materials were evaluated for their ability to complex with tin and bismuth catalysts as follows:

TABLE 30

| | Catalyst Formulation No.(g) | | | | | | | | | | | | |
|---|---|---|---|---|---|---|---|---|---|---|---|---|---|
| | 4574-131 Series | | | | | 4574-46 Series | | | | 4599 Series | | | |
| Ingredient | 131A | 131E | 131F | 131G | 131H | 46A | 46B | 46C | 46D | A(65/6) | B(65/8) | C(2/6) | D(50) |
| T-12 Tin Catalyst | — | 0.5 | 0.5 | — | — | 0.75 | 0.90 | 0.90 | 0.75 | — | — | — | — |
| Coscat 83 Bismuth Catalyst | — | — | — | 0.57 | 0.57 | — | — | — | — | 0.62 | 0.62 | 0.62 | 0.62 |
| Catechol | — | 0.87 | — | 0.87 | — | — | — | — | — | 0.47 | — | — | — |
| Paramethoxy phenol | — | — | 0.98 | — | 0.98 | — | — | — | — | — | 0.53 | — | — |
| Methyl-2,4-Dihydroxybenzoate | — | — | — | — | — | 1 | — | — | — | — | — | — | — |
| 3-Methoxy catechol | — | — | — | — | — | — | 1 | — | — | — | — | — | — |
| 5-Methoxy resorcinol | — | — | — | — | — | — | — | 1 | — | — | — | — | — |

TABLE 30-continued

| Ingredient | Catalyst Formulation No.(g) | | | | | | | | | | | | |
|---|---|---|---|---|---|---|---|---|---|---|---|---|---|
| | 4574-131 Series | | | | | 4574-46 Series | | | | 4599 Series | | | |
| | 131A | 131E | 131F | 131G | 131H | 46A | 46B | 46C | 46D | A(65/6) | B(65/8) | C(2/6) | D(50) |
| Methyl-3,5-dihydroxybenzoate | — | — | — | — | — | — | — | — | 1 | — | — | — | — |
| Pyrogallol | — | — | — | — | — | — | — | — | — | — | — | 0.50 | — |
| MAK/BAc (½ volume ratio) | 15.0 | 13.6 | 13.5 | 13.6 | 13.5 | 8.25 | 8.10 | 8.10 | 8.25 | 8.93 | 8.85 | 8.88 | 9.38 |

The coatings formulations for each catalyst series is set forth below.

TABLE 31

| Ingredient | 4574-131 Series | 4574-46 Series | 4599 Series |
|---|---|---|---|
| Tone 0305 Polyol | 255 | 151 | 255 |
| Desmodur N3390 Polyisocyanate | 336 | 199 | 336 |
| MAK/BAc (½ volume ratio) | 228 | 135 | 228 |
| Catalyst | 2.04 | 10 drops/ 20 g samples | 15 drops/ 20 g samples |

The 4574-131 series was tested for pot life and for cure response by spraying with DMEOLA catalyst followed by baking at 82.2° C. for 10 minutes. The 4574-46 series was tested for pot life in one ounce bottles neat or with 5 drops of liquid DMEOLA. The 4599 series were tested for pot life in 1 oz. bottles neat. With 8 drops of liquid DMEOLA added to duplicate samples, 2 mil films of the 4599 series were drawn down, baked at 82.2° C. for 5 minutes, and MEK rub data generated. The following data was recorded.

TABLE 32A

| Catalyst 4574-131 Series | Gel Time | MEK Rubs |
|---|---|---|
| A | >24 hrs | wet film |
| E | >3 hrs | 200 |
| F | 15 min. | — |
| G | >3 hrs | 160 |
| H | 15 min. | — |

TABLE 32B

| Catalyst 4574-46 Series | Gel Time (Minutes) | |
|---|---|---|
| | No Amine | Amine |
| A | 2 | 2 |
| B | >500 | 43 |
| C | 7 | 3 |
| D | 23 | 8 |

TABLE 32C

| Catalyst 4599 Series | Gel Time | MEK Rubs |
|---|---|---|
| A | >4 hrs | >200 |
| B | <1 hr | >200 |
| C | >4 hrs | 100 |
| D | <1 hr | >200 |

The following pot life data can be appreciated when it is realized that equivalent amounts of uncomplexed tin or bismuth catalysts provide a pot life (gel time) of less than 15 minutes. Thus, only the phenolic materials with adjacent (e.g. α-,β-) hydroxyl groups (e.g. catechol, 3-methoxy catechol, and pyrogallol) successfully complex with tin and bismuth catalysts, and yet release the catalyst in the presence of amine or heat. However, it is believed that some non-adjacent hydroxyl group compounds may function (e.g. 2,3',4-trihydroxydiphenyl) based on U.S. Pat. No. 4,396,647.

We claim:

1. An activatable catalyst effective for the reaction of a hydroxyl compound and an isocyanate compound and being activated in the presence of an amine activator or heat, comprising the reaction product of:
   (a) a metal catalyst selected from a tin catalyst, a bismuth catalyst, and mixtures thereof; and
   (b) a molar excess of a complexing agent selected from:
      (1) a mercapto compound;
      (2) a polyphenol with adjacent hydroxyl groups and characterized by being reactable with an isocyanate group in the presence of a tertiary amine activator; and
      (3) mixtures thereof
said reaction product being dispersed in organic solvent.

2. The catalyst of 1 wherein said tin catalyst is selected from the group consisting of stannous acetate, stannic oxide, stannous octoate, dibutyltin dioctoate, tin mercaptides, stannous citrate, stannous oxylate, stannous chloride, stannic chloride, tetra-phenyl tin, tetrabutyl tin, tri-n-butyl tin acetate, di-alkyl tin dicarboxylates, dimethyl tin dichloride, and mixtures; and said bismuth catalyst is selected from the group consisting of bismuth tricarboxylates, bismuth nitrate, bismuth halides, bismuth sulfide, basic bismuth dicarboxylates, and mixtures thereof.

3. The catalyst of claim 1 wherein said organic solvent includes a keto chelating agent.

4. The catalyst of claim 1 wherein the molar ratio of mercapto groups from said mercapto compound or phenol groups from said polyphenol to the metal content of said metal catalyst ranges from between about 2:1 to about 500:1.

5. The catalyst of claim 1 wherein said mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-parachlorothiophenol, dimercapto benzothiazole, 3,4-dimercapto toluene, allyl mercaptan, benzyl mercaptan, 1,6-hexane dithiol, 1-octane thiol, parathiocresol, 2,3,5,6-tetrafluorothiophenol, cyclohexyl mercaptan, methylthioglycolate, various mercapto pyridines, dithioerythritol, 6-ethoxy-2-mercaptobenzothiazole, d-limonene dimercaptan, and mixtures thereof.

6. The catalyst of claim 1 wherein said polyphenol is selected from the group consisting of catechol, pyrogallol, 3-methoxy catechol, and mixtures thereof.

7. A catalyzed reaction mixture which comprises:
(a) a polyol;
(b) a polyisocyanate; and
(c) an activatable catalyst comprising the reaction product of a metal catalyst selected from a tin catalyst, a bismuth catalyst, and mixtures thereof; and
(d) a molar excess of a complexing agent selected from:
(1) a mercapto compound;
(2) a polyphenol having adjacent hydroxyl groups and characterized by being reactable with an isocyanate group in the presence of a tertiary amine activator; and
(3) mixtures thereof.

8. The reaction mixture of claim 7 wherein said polyol comprises an aliphatic polyol and said polyisocyanate comprises an aliphatic polyisocyanate.

9. The reaction mixture of claim 7 wherein which additionally comprises a volatile organic solvent.

10. The reaction mixture of claim 7 wherein said tin catalyst is selected from the group consisting of stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin acetate, di-alkyl tin dicarboxylates, dimethyl tin dichloride, and mixtures; and said bismuth catalyst is selected from the group consisting of bismuth tricarboxylates, bismuth nitrate, bismuth halides, bismuth sulfide, basic bismuth dicarboxylates, and mixtures thereof.

11. The catalyzed reaction mixture of claim 7 which additionally comprises an amine activator.

12. The reaction mixture claim 11 wherein said amine activator comprises a tertiary amine.

13. The reaction mixture of claim 12 wherein said tertiary amine is selected from the group consisting of triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropylpyridine, 2,4,6-collidine, quinoline, tripropyl amine, isoquinoline, N-ethyl morpholine, triethylene diamine, and mixtures thereof.

14. The reaction mixture of claim 7 wherein the proportion of metal from said metal catalyst by weight of said reaction mixture ranges from between about 0.0001 and 1.0 percent.

15. The reaction mixture of claim 7 wherein the molar ratio of mercaptan groups from said mercapto compound or phenol groups from said polyphenol to the metal content of said metal catalyst ranges from between about 2:1 and 500:1.

16. The reaction mixture of claim 7 wherein said activatable catalyst additionally comprises an organic solvent.

17. The reaction mixture of claim 16 wherein said organic solvent includes a keto chelating agent.

18. The reaction mixture of claim 17 wherein said keto chelating agent comprises 2,4-pentanedione.

19. The reaction mixture of claim 7 wherein said mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,5,6-tetrafluorothiophenol, cyclohexyl mercaptan, methylthioglycolate, various mercapto pyridines, dithioerythritol, 6-ethoxy-2-mercaptobenzothiazole, d-limonene dimercaptan, and mixtures thereof.

20. The reaction mixture of claim 7 wherein said polyphenol is selected from the group consisting of catechol, pyrogallol, 3-methoxy catechol, and mixtures thereof.

21. A catalyzed reaction mixture which comprises:
(a) a polyol polymer which bears mercapto groups, wherein said mercapto groups have been complexed with a metal catalyst selected from a tin catalyst, a bismuth catalyst, and mixtures thereof, the mercaptan groups being present in a molar excess over said metal catalyst; and
(b) a polyisocyanate.

22. The reaction mixture of claim 21 wherein the hydroxyl groups of said polyol polymer comprise aliphatic hydroxyl groups.

23. The reaction mixture of claim 21 wherein said polyisocyanate comprises an aliphatic polyisocyanate.

24. The reaction mixture of claim 23 wherein the hydroxyl groups of said polyol polymer comprise aliphatic hydroxyl groups.

25. The reaction mixture of claim 21 additionally comprising a volatile organic solvent.

26. The reaction mixture of claim 21 which additionally contains a tertiary amine activator.

27. The reaction mixture of claim 21 wherein said metal catalyst is a tin catalyst wherein the proportion of tin from said tin catalyst ranges from between about 0.0001 and 1.0 percent by weight of said reaction mixture.

28. The reaction mixture of claim 21 wherein the molar ratio of mercapto groups to tin content from said tin catalyst ranges from between about 2:1 and 500:1.

29. The reaction mixture of claim 21 wherein said tin catalyst is selected from the group consisting of stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin acetate, di-alkyl tin dicarboxylates, dimethyl tin dichloride, and mixtures thereof.

30. A method for curing a catalyzed reaction mixture which comprises:
(A) applying said catalyzed reaction mixture as a film onto a substrate, said catalyzed reaction mixture comprising a polyol, a polyisocyanate, and an activatable catalyst comprising the reaction product of:
(a) a metal catalyst selected from a tin catalyst, a bismuth catalyst, and mixtures thereof; and
(b) a molar excess of a complexing agent selected from:
(1) a mercapto compound;
(2) a polyphenol having adjacent hydroxyl groups and characterized by being reactable with an isocyanate group in the presence of a tertiary amine activator; and
(3) mixtures thereof; and (B) exposing said applied film to one or more of heat or an amine activator for cure of said applied film.

31. The method of claim 30 wherein said polyol comprises an aliphatic polyol.

32. The method of claim 30 wherein said polyisocyanate comprises an aliphatic polyisocyanate.

33. The method of claim 32 wherein said polyol comprises an aliphatic polyol.

34. The method of claim 30 wherein said reaction mixture additionally comprises a volatile organic solvent.

35. The method of claim 30 wherein said amine activator comprises a tertiary amine.

36. The method of claim 30 wherein said amine is in the vaporous state.

37. The method of claim 35 wherein said tertiary amine is selected from the group consisting of triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, tripropyl amine, isoquinoline, N-ethyl morpholine, triethylene diamine, and mixtures thereof.

38. The method of claim 30 wherein said tin catalyst is selected from the group consisting of stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin acetate, di-alkyl tin dicarboxylates dimethyl tin dichloride, and mixtures; and said bismuth catalyst is selected from the group consisting of bismuth tricarboxylates, bismuth nitrate, bismuth halides, bismuth sulfide, basic bismuth dicarboxylates, and mixtures thereof.

39. The method of claim 30 wherein the molar ratio of mercapto groups from said mercapto compound or phenol groups from said polyphenol to the metal content of said metal catalyst ranges from between about 2:1 and 500:1.

40. The method of claim 30 wherein the proportion of metal from said metal catalyst ranges from between about 0.0001 and 1.0 percent by weight of said reaction mixture.

41. The method of claim 30 wherein said polyol and said mercapto compound are the same compound.

42. The method of claim 30 wherein said applied film is exposed to an amine activator and then heated at a temperature of between about 50° and 150° C.

43. The method of claim 30 wherein said activatable catalyst is dispersed in an organic solvent.

44. The method of claim 43 wherein said organic solvent includes a keto chelating agent.

45. The method of claim 44 wherein said keto chelating agent comprises 2,4-pentanedione.

46. The method of claim 30 wherein said mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-parachlorothiophenol, dimercapto benzothiazole, 3,4-dimercapto toluene, allyl mercaptan, benzyl mercaptan, 1,6-hexane dithiol, 1-octane thiol, parathiocresol, 2,3,5,6-tetrafluorothiophenol, cyclohexyl mercaptan, methylthioglycolate, various mercapto pyridines, dithioerythritrol, 6-ethoxy-2-mercaptobenzothiazole, d-limonene dimercaptan, and mixtures thereof.

47. The catalyst of claim 30 wherein said polyphenol is selected from the group consisting of catechol, pyrogallol, 3-methoxy catechol, and mixtures thereof.

48. A method for curing a catalyzed reaction mixture which comprises:
  (A) concurrently generating an atomizate of said catalyzed reaction mixture and a vaporous amine activator, said catalyzed reaction mixture comprising a polyol, a polyisocyanate, and an activatable catalyst comprising the reaction product of:
    (a) a metal catalyst selected from a tin catalyst, a bismuth catalyst, and mixtures thereof; and
    (b) a molar excess of a complexing agent selected from:
      (1) a mercapto compound;
      (2) a polyphenol having adjacent hydroxyl groups and characterized by being reactable with an isocyanate group in the presence of a tertiary amine activator; and
      (3) mixtures thereof;
  (B) mixing said atomizate and said vaporous amine activator; and
  (C) directing said mixture onto said substrate to form an applied cured film thereof.

49. The method of claim 48 wherein said polyol comprises an aliphatic polyol.

50. The method of claim 48 wherein said polyisocyanate comprises an aliphatic polyisocyanate.

51. The method of claim 50 wherein said polyol comprises an aliphatic polyol.

52. The method of claim 48 wherein said reaction mixture additionally comprises a volatile organic solvent.

53. The method of claim 52 wherein said volatile organic solvent includes a keto chelating agent.

54. The method of claim 48 wherein said vaporous amine activator comprises a vaporous tertiary amine.

55. The method of claim 54 wherein said vaporous tertiary amine is selected from the group consisting of triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, tripropyl amine, isoquinoline, N-ethyl morpholine, triethylene diamine, and mixtures thereof.

56. The method of claim 48 wherein said tin catalyst is selected from the group consisting of stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin acetate, di-alkyl tin dicarboxylates, dimethyl tin dichloride, and mixtures; and said bismuth catalyst is selected from the group consisting of bismuth tricarboxylates, bismuth nitrate, bismuth halides, bismuth sulfide, basic bismuth dicarboxylates, and mixtures thereof.

57. The method of claim 48 wherein the molar ratio of mercapto groups from said mercapto compound or phenol groups from said polyphenol to the metal content of said metal catalyst ranges from between about 2:1 and 500:1.

58. The method of claim 48 wherein the proportion of metal from said metal catalyst by weight of said reaction mixture ranges from between about 0.0001 and 1.0 percent by weight.

59. The method of claim 48 wherein said polyol and said mercapto compound are the same compound.

60. The method of claim 48 wherein said substrate having said applied film thereon is heated at a temperature ranging from between about 50° and 150° C.

61. The method of claim 48 wherein said mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-parachlorothiophenol, dimercapto benzothiazole, 3,4-dimercapto toluene, allyl mercaptan, benzyl mercaptan, 1,6-hexane dithiol, 1-octane thiol, parathiocresol, 2,3,5,6-tetrafluorothiophenol, cyclohexyl mercaptan, methylthioglycolate, various mercapto pyridines, dithioerythritrol, 6-ethoxy-2-mercaptobenzothiazole, d-limonene dimercaptan, and mixtures thereof.

62. The catalyst of claim 48 wherein said polyphenol is selected from the group consisting of catechol, pyrogallol, 3-methoxy catechol, and mixtures thereof.

63. A method for enhancing the stability of a catalyzed reaction mixture comprising a polyol, a polyisocyanate, and a metal catalyst selected from a tin catalyst, a bismuth catalyst, and mixtures thereof, which comprises forming said metal catalyst into an activatable catalyst by mixing said metal catalyst with a complexing agent selected from:
(1) a mercapto compound;
(2) a polyphenol having adjacent hydroxyl groups and characterized by being reactable with an isocyanate group in the presence of a tertiary amine activator; and
(3) mixtures thereof.

64. The method of claim 63 wherein said mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-parachlorothiophenol, dimercapto benzothiazole, 3,4-dimercapto toluene, allyl mercaptan, benzyl mercaptan, 1,6-hexane dithiol, 1-octane thiol, parathiocresol, 2,3,5,6-tetrafluorothiophenol, cyclohexyl mercaptan, methylthioglycolate, various mercapto pyridines, dithioerythritrol, 6-ethoxy-2-mercaptobenzothiazole, d-limonene dimercaptan, and mixtures thereof.

65. The catalyst of claim 63 wherein said polyphenol is selected from the group consisting of catechol, pyrogallol, 3-methoxy catechol, and mixtures thereof.

66. The method of claim 63 wherein said activatable metal additionally comprises an organic solvent.

67. The method of claim 66 wherein said organic solvent includes a keto chelating agent.

68. The method of claim 63 wherein said coating composition additionally comprises a volatile organic solvent.

* * * * *